US009164301B2

(12) United States Patent
Uehata et al.

(10) Patent No.: US 9,164,301 B2
(45) Date of Patent: Oct. 20, 2015

(54) DISPLAY DEVICE

(75) Inventors: Masaki Uehata, Osaka (JP); Kohji Saitoh, Osaka (JP); Masami Ozaki, Osaka (JP); Toshihiro Yanagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/009,604

(22) PCT Filed: Apr. 4, 2012

(86) PCT No.: PCT/JP2012/059262
§ 371 (c)(1),
(2), (4) Date: Oct. 3, 2013

(87) PCT Pub. No.: WO2012/137851
PCT Pub. Date: Oct. 11, 2012

(65) Prior Publication Data
US 2014/0022232 A1    Jan. 23, 2014

(30) Foreign Application Priority Data

Apr. 8, 2011 (JP) ................................. 2011-086816

(51) Int. Cl.
*G02F 1/13* (2006.01)
*G09G 3/36* (2006.01)

(52) U.S. Cl.
CPC ............ *G02F 1/1309* (2013.01); *G09G 3/3614* (2013.01); *G09G 3/3688* (2013.01); *G09G 2310/0291* (2013.01)

(58) Field of Classification Search
CPC .......... G09G 3/3688; G09G 2310/027; G09G 3/3614; G09G 2300/0852; G09G 2300/0819; G09G 2310/0248; G09G 2310/0291; G09G 3/20; G09G 2320/0295; G09G 3/3696; G09G 2300/0417; G09G 2300/0847; G09G 2300/08; G09G 2310/08; G09G 2330/08; G09G 2310/0297; G09G 2320/0233; G09G 2320/0247; G09G 2320/0261; G09G 2330/021; G09G 2330/023; G02F 1/136227; G02F 1/136209; G02F 1/133553; G02F 1/1368; G02F 1/133371; G02F 1/133555; G02F 1/1345; G02F 1/1309; G02F 1/136286
USPC .......... 345/87, 89, 98, 99, 100, 204, 211, 690
See application file for complete search history.

(56) References Cited

U.S. PATENT DOCUMENTS 7,432,904 B2* 10/2008 Kang .............................. 345/98
8,717,343 B2* 5/2014 Lee et al. ....................... 345/209

(Continued)

FOREIGN PATENT DOCUMENTS

JP    2008-058337 A    3/2008

OTHER PUBLICATIONS

Official Communication issued in International Patent Application No. PCT/JP2012/059262, mailed on May 15, 2012.

*Primary Examiner* — Duc Dinh
(74) *Attorney, Agent, or Firm* — Keating & Bennett, LLP

(57) ABSTRACT

An auxiliary wire, which can be connected to each of a plurality of data signal lines (Sn), is constituted by (i) a first auxiliary wire (17) provided so as to intersect the plurality of data signal lines (Sn) on a side where end parts of the respective plurality of data signal lines (Sn) are connected to a data signal line driving circuit (4) and (ii) a second auxiliary wire (18) provided so as to intersect the plurality of data signal lines (Sn) on a side of the other end parts of the respective plurality of data signal lines (Sn). Between the first auxiliary wire (17) and the second auxiliary wire (17), there are provided (i) a positive-polarity amplifier circuit (6) for receiving a positive data signal from the data signal line driving circuit (4) and (ii) a negative-polarity amplifier circuit (7) for receiving a negative data signal from the data signal line driving circuit (4). An output signal is supplied to the second auxiliary wire (18) from the positive-polarity amplifier circuit (6) or the negative-polarity amplifier circuit (7).

20 Claims, 26 Drawing Sheets

(56) References Cited

U.S. PATENT DOCUMENTS

| | | | |
|---|---|---|---|
| 2005/0110738 A1* | 5/2005 | Kim et al. | 345/100 |
| 2005/0174316 A1 | 8/2005 | Kang | |
| 2007/0109235 A1* | 5/2007 | Hsu et al. | 345/87 |
| 2007/0285595 A1 | 12/2007 | Hirao | |
| 2008/0158131 A1* | 7/2008 | Park et al. | 345/98 |
| 2009/0167730 A1* | 7/2009 | Kwak et al. | 345/204 |

* cited by examiner

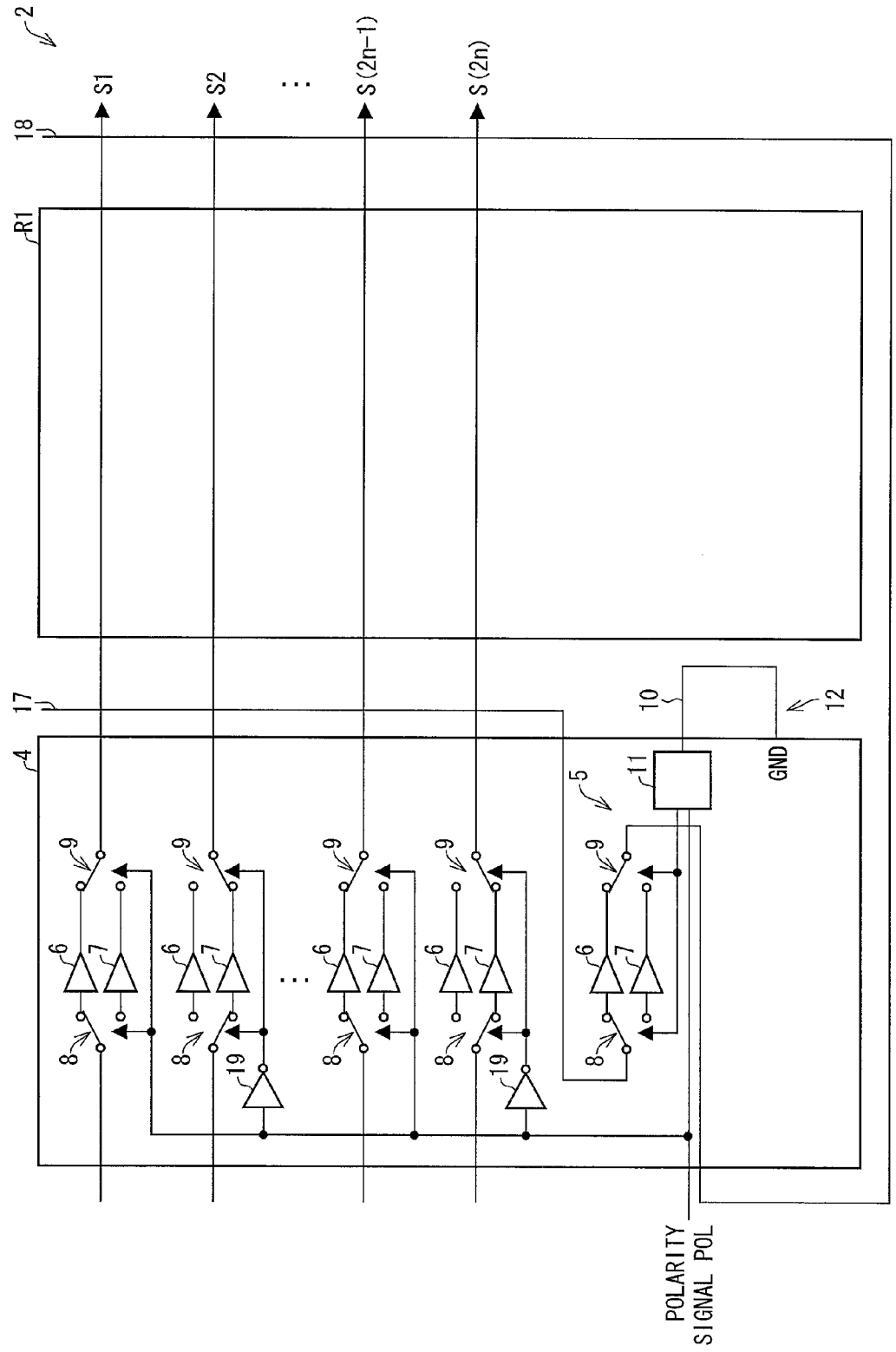
F I G. 4

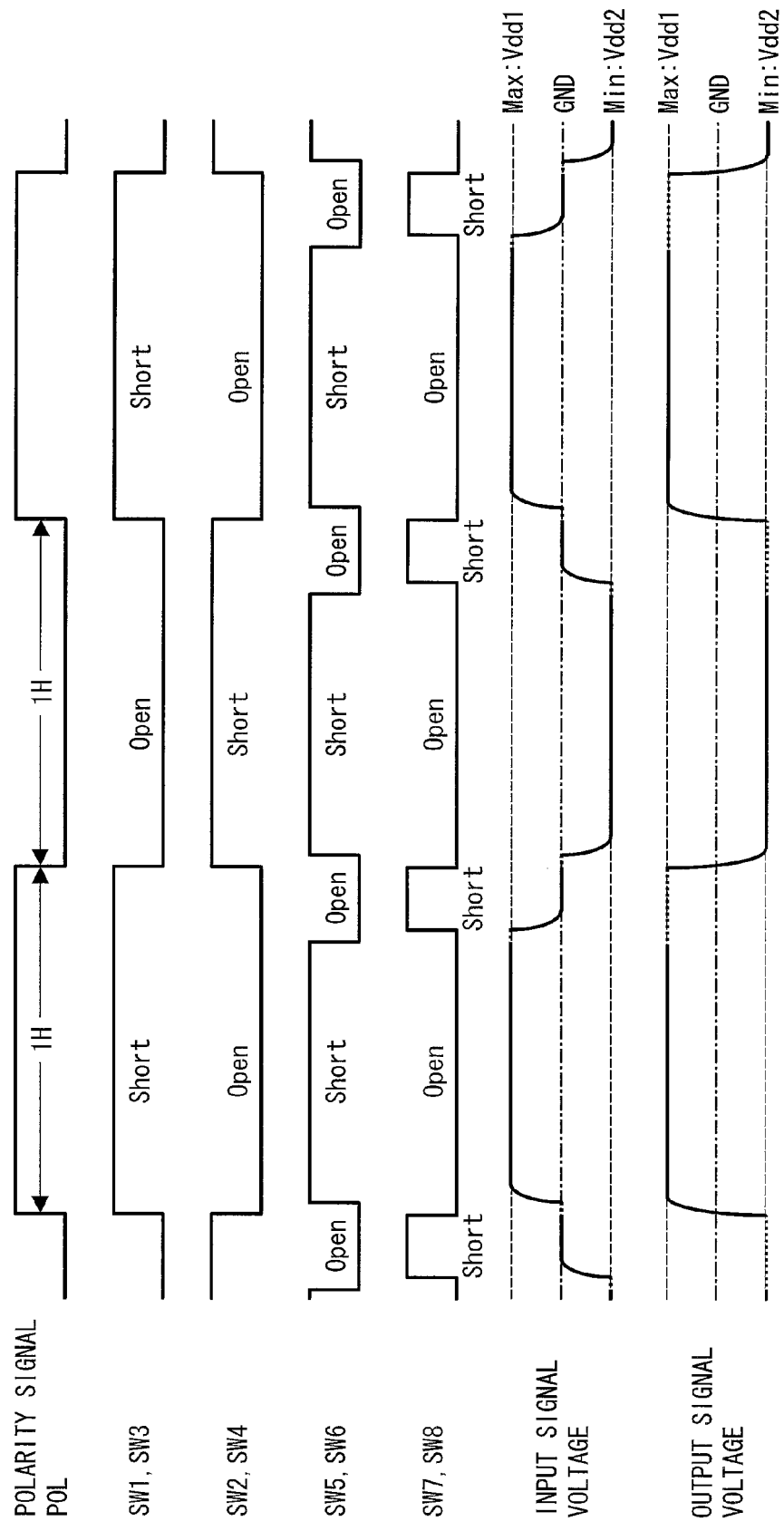

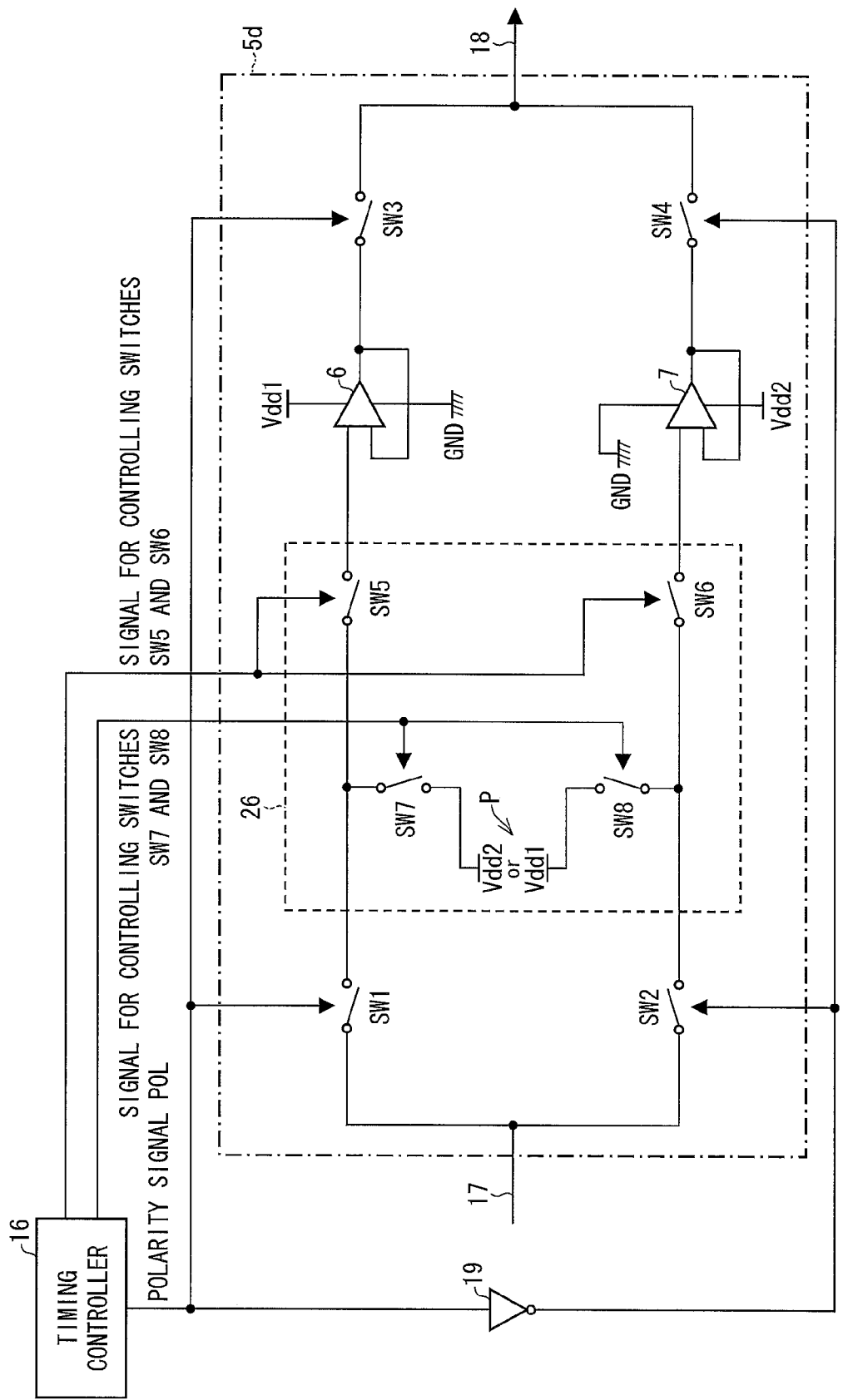
F I G. 2 1

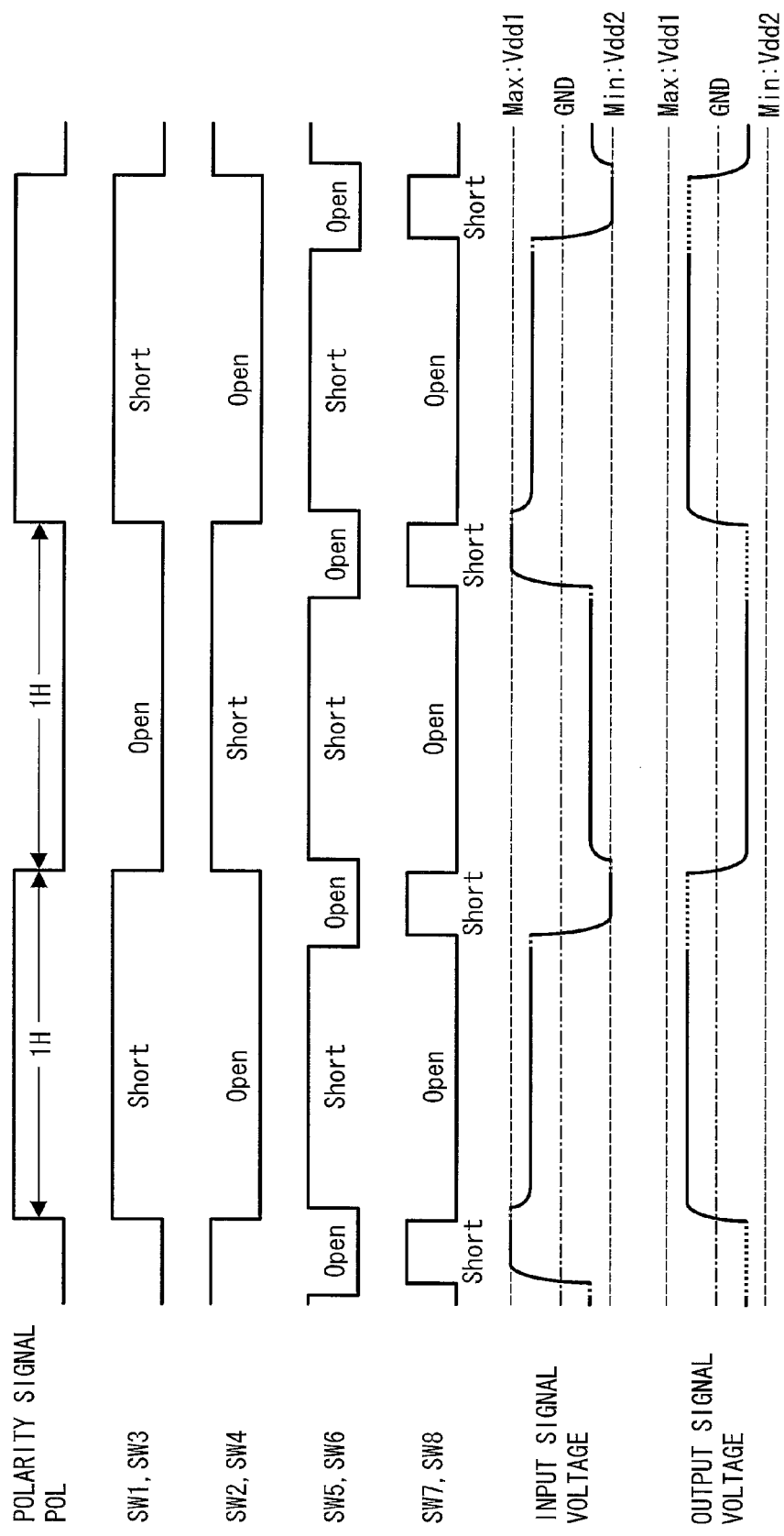

DISPLAY DEVICE

TECHNICAL FIELD

The present invention relates to a display device including an electric wire and a repair circuit which are used to repair a defect, such as electric disconnection of a data signal line, in a case where the defect occurs so that the display device is driven.

BACKGROUND ART

In recent years, in the field of display devices, there is a tendency to increase the length and/or the number of signal lines in accordance with an increase in size and high definition of a display device. There is also a tendency to increasingly thin the signal lines so as to increase an aperture ratio which directly affects the transmittance of a display panel.

Such tendencies have increased the possibility of causing a defect such as electric disconnection of a signal line in the display device.

Conventionally, in a case where a display device causes a defect such as electric disconnection of a signal line, the defect is repaired so that the display device is driven.

FIG. 25 illustrates, as an example of the above case, a liquid crystal display device which includes electric wires and repair circuits which are used to repair defects, such as electric disconnection of data signal lines, in a case where the defects occur so that the liquid crystal display device is driven.

As illustrated in FIG. 25, a liquid crystal display device 109 includes (i) a liquid crystal display panel 100 and (ii) a control substrate 108 that is connected to the liquid crystal display panel 100 via an FPC 107.

The liquid crystal display panel 100 has a display region R1 in which a plurality of pixels (not illustrated) are arranged in a matrix manner. The liquid crystal display panel 100 includes (i) a scan signal line driving circuit (gate driver) 101 for supplying scan signals to a plurality of scan signal lines (not illustrated) and (ii) a data signal line driving circuit (source driver) 102a and a data signal line driving circuit (source driver) 102b each for supplying data signals to a plurality of data signal lines S1, S2, . . . , and S'(2n). The scan signal line driving circuit 101 and the data signal line driving circuits 102a and 102b are provided around the display region R1.

In the display region R1, the plurality of scan signal lines and the plurality of data signal lines S1, S2, . . . , and S'(2n) intersect with each other (not illustrated). In the vicinity of intersections where the plurality of scan signal lines and the plurality of data signal lines S1, S2, . . . , and S'(2n) intersect with each other, there are provided respective switching elements (not illustrated), such as TFTs, which are electrically connected to pixel electrodes of the respective plurality of pixels.

As illustrated in FIG. 25, the data signal line driving circuit 102a includes (i) a source amplifier circuit 103a for supplying data signals to the data signal lines S1, S2, . . . , and S(2n) and (ii) a repair amplifier circuit 104a which is used to repair electric disconnection of the data signal lines S1, S2, . . . , and S(2n) in a case where the electric disconnection occurs so that the liquid crystal display device 109 is driven.

A preliminary wire 105a is provided in a region between the display region R1 and the data signal line driving circuit 102a so as to intersect end parts of the respective data signal lines S1, S2, . . . , and S(2n), which end parts are on a side of the data signal line driving circuit 102a. A preliminary wire 106a is provided so as to (i) extend to a region other than the display region R1 and (ii) intersect the other end parts of the respective data signal lines S1, S2, . . . , and S(2n).

The repair amplifier circuit 104a has (i) an input terminal to which the preliminary wire 105a is electrically connected and (ii) an output terminal to which the preliminary wire 106a is electrically connected.

Similar to the data signal line driving circuit 102a, the data signal line driving circuit 102b includes (i) a source amplifier circuit 103b for supplying data signals to the data signals S'1, S'2, . . . , and S'(2n) and (ii) a repair amplifier circuit 104b which is used to repair electric disconnection of the data signal lines S'1, S'2, . . . , and S'(2n) in a case where the electric disconnection occurs so that the liquid crystal display device 109 is driven.

A preliminary wire 105b is provided in a region between the display region R1 and the data signal line driving circuit 102b so as to intersect end parts of the respective data signal lines S'1, S'2, . . . , and S'(2n), which end parts are on a side of the data signal line driving circuit 102b. A preliminary wire 106b is provided so as to (i) extend to the region other than the display region R1 and (ii) intersect the other end parts of the respective data signal lines S'1, S'2, . . . , and S'(2n).

The repair amplifier circuit 104b has (i) an input terminal to which the preliminary wire 105b is electrically connected and (ii) an output terminal to which the preliminary wire 106b is electrically connected.

The control substrate 108 includes an electric power generating circuit and a timing controller (both of which are not illustrated).

According to the configuration, in a case where an electrically disconnected part (see an "X" in FIG. 25) is found in the data signal line S1 during a process of inspecting the liquid crystal display device 109, it is possible to short-circuit (electrically connect) the data signal line S1 with the preliminary wire 105a and the preliminary wire 106a.

As such, the data signal line driving circuit 102a can (i) supply, as usual, a data signal toward the electrically disconnected part via the end part of the data signal line S1, which end part is on the side of the data signal line driving circuit 102a and (ii) also supply the data signal toward the electrically disconnected part via the preliminary wire 105a, the repair circuit 104a, the preliminary wire 106a, and the other end part of the data signal line S1.

It is therefore possible to supply the data signal to the whole data signal line S1 which has the electrically disconnected part.

Further, in a case where an electrically disconnected part (see an "X" in FIG. 25) is found in the data signal line S'3, it is possible to supply, in the same manner as the above, a data signal to the whole data signal line S'3 which has the electrically disconnected part.

The liquid crystal display device 109 thus includes the repair amplifier circuits 104a and 104b, and the preliminary wires 105a, 105b, 106a and 106b. Therefore, even in a case where a defect, such as electrical disconnection of the data signal lines S1, S2, . . . , and S'(2n), occurs, it is possible to drive the liquid crystal display device 109 by repairing the defect.

CITATION LIST

Patent Literature

Patent Literature 1
Japanese Patent Application Publication, Tokukai, No. 2008-58337 A (Publication Date: Mar. 13, 2008)

SUMMARY OF INVENTION

Technical Problem

FIG. 26 is a view illustrating a circuit configuration of the data signal line driving circuit 102a.

As illustrated in FIG. 26, the source amplifier circuit 103a for supplying data signals to the data signal lines S1, S2, ..., and S(2n) includes analog amplifiers 110 which are electrically connected to the respective data signal lines S1, S2, ..., and S(2n). That is, the source amplifier circuit 103a includes 2n analog amplifiers 110 which are provided for the respective data signal lines S1, S2, ..., and S(2n).

The repair amplifier circuit 104a includes one (1) analog amplifier 110 that is identical to those of the source amplifier circuit 103a. The repair amplifier circuit 104a has (i) the input terminal to which the preliminary wire 105a is electrically connected and (ii) the output terminal to which the preliminary wire 106a is electrically connected.

Note that the number of repair amplifier circuits and the number of preliminary wires can be increased as needed, as indicated by a dotted line in FIG. 26.

In a case where the liquid crystal display device 109 is driven by means of reverse polarity driving such as dot reversal driving, line reversal driving, or frame reversal driving, each of the analog amplifiers 110 included in the data signal line driving circuit 102a receives positive and negative data signals. Therefore, each of the analog amplifiers 110 should have a high resistance to voltages. This ultimately increases the size of each of the analog amplifiers 110.

The repair amplifier circuit 104a, which includes such an upsized analog amplifier 110, not only becomes relatively large in size but also consumes more electric power. Therefore, the liquid crystal display device 109, which includes the repair amplifier circuit 104a thus increased in size and consumes more electric power, has (i) a widened frame region where no image is displayed and (ii) difficulty in realizing low power consumption.

The present invention was made in view of the problems, and an object of the present invention is to provide a display device capable of (i) narrowing a frame region where no image is displayed and (ii) realizing low power consumption.

Solution to Problem

In order to attain the object, a display device of the present invention is configured to include: a data signal line driving circuit; a plurality of data signal lines connected to the data signal line driving circuit; first and second auxiliary wires, each of which can be connected to each of the plurality of data signal lines, the first auxiliary wire being provided so as to intersect the plurality of data signal lines on a side where end parts of the respective plurality of data signal lines are connected to the data signal line driving circuit, the second auxiliary wire being provided so as to intersect the plurality of data signal lines on a side of the other end parts of the respective plurality of data signal lines; a positive-polarity amplifier circuit for receiving a positive data signal from the data signal line driving circuit via the first auxiliary wire; and a negative-polarity amplifier circuit for receiving a negative data signal from the data signal line driving circuit via the first auxiliary wire, an output signal being supplied to the second auxiliary wire from the positive-polarity amplifier circuit or the negative-polarity amplifier circuit.

The display device includes the first auxiliary wire, the second auxiliary wire, the positive-polarity amplifier circuit, and the negative-polarity amplifier circuit, which are used to repair a defect, such as electric disconnection of a data signal line, in a case where the defect occurs so that the display device is driven.

The positive data signal is supplied to the second auxiliary wire via the positive-polarity amplifier circuit, and the negative data signal is supplied to the second auxiliary wire via the negative-polarity amplifier circuit.

It is therefore possible to lower each voltage-resistance of a positive-polarity amplifier and a negative-polarity amplifier, as compared with that of a conventional amplifier.

According to the configuration, it is possible to narrow a frame region where (i) the positive-polarity amplifier circuit and the negative-polarity amplifier circuit are provided and (ii) no image is displayed, and it is also possible to attain low power consumption.

Advantageous Effects of Invention

A display device of the present invention is configured to include: a data signal line driving circuit; a plurality of data signal lines connected to the data signal line driving circuit; first and second auxiliary wires, each of which can be connected to each of the plurality of data signal lines, the first auxiliary wire being provided so as to intersect the plurality of data signal lines on a side where end parts of the respective plurality of data signal lines are connected to the data signal line driving circuit, the second auxiliary wire being provided so as to intersect the plurality of data signal lines on a side of the other end parts of the respective plurality of data signal lines; a positive-polarity amplifier circuit for receiving a positive data signal from the data signal line driving circuit via the first auxiliary wire; and a negative-polarity amplifier circuit for receiving a negative data signal from the data signal line driving circuit via the first auxiliary wire, an output signal being supplied to the second auxiliary wire from the positive-polarity amplifier circuit or the negative-polarity amplifier circuit.

According to the configuration, it is therefore possible to provide a display device (i) whose frame region where no image is displayed can be narrowed and (ii) which can attain low power consumption.

Figure 3:
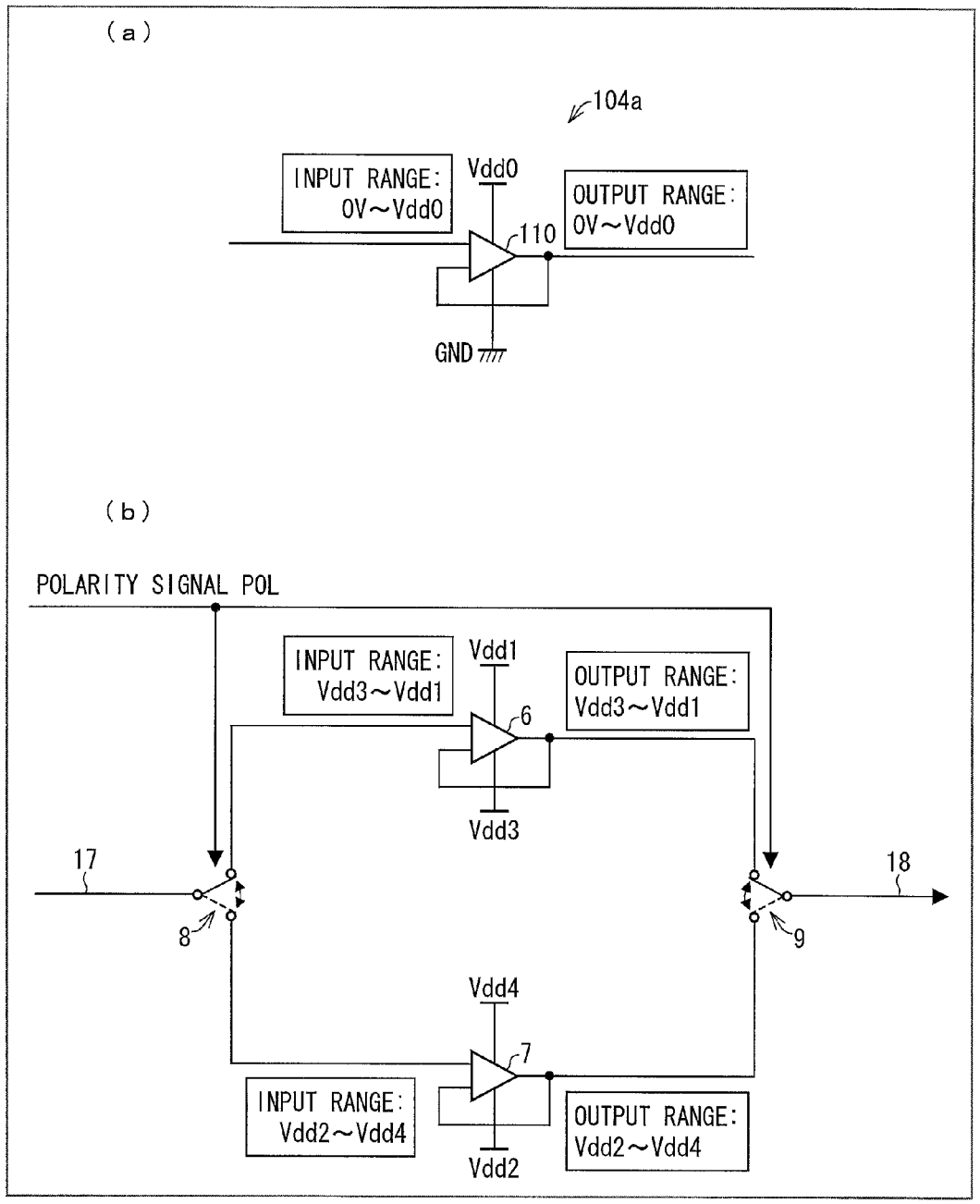

(a) of FIG. 3 is a view illustrating a circuit configuration of a repair amplifier circuit that is included in a conventional liquid crystal display device. (b) of FIG. 3 is a view illustrating a circuit configuration of a repair amplifier circuit that can be used in the embodiment of the present invention.

FIG. 4 is a view schematically illustrating a configuration of a liquid crystal display panel that is included in the liquid crystal display device of the embodiment of the present invention.

Figure 5:
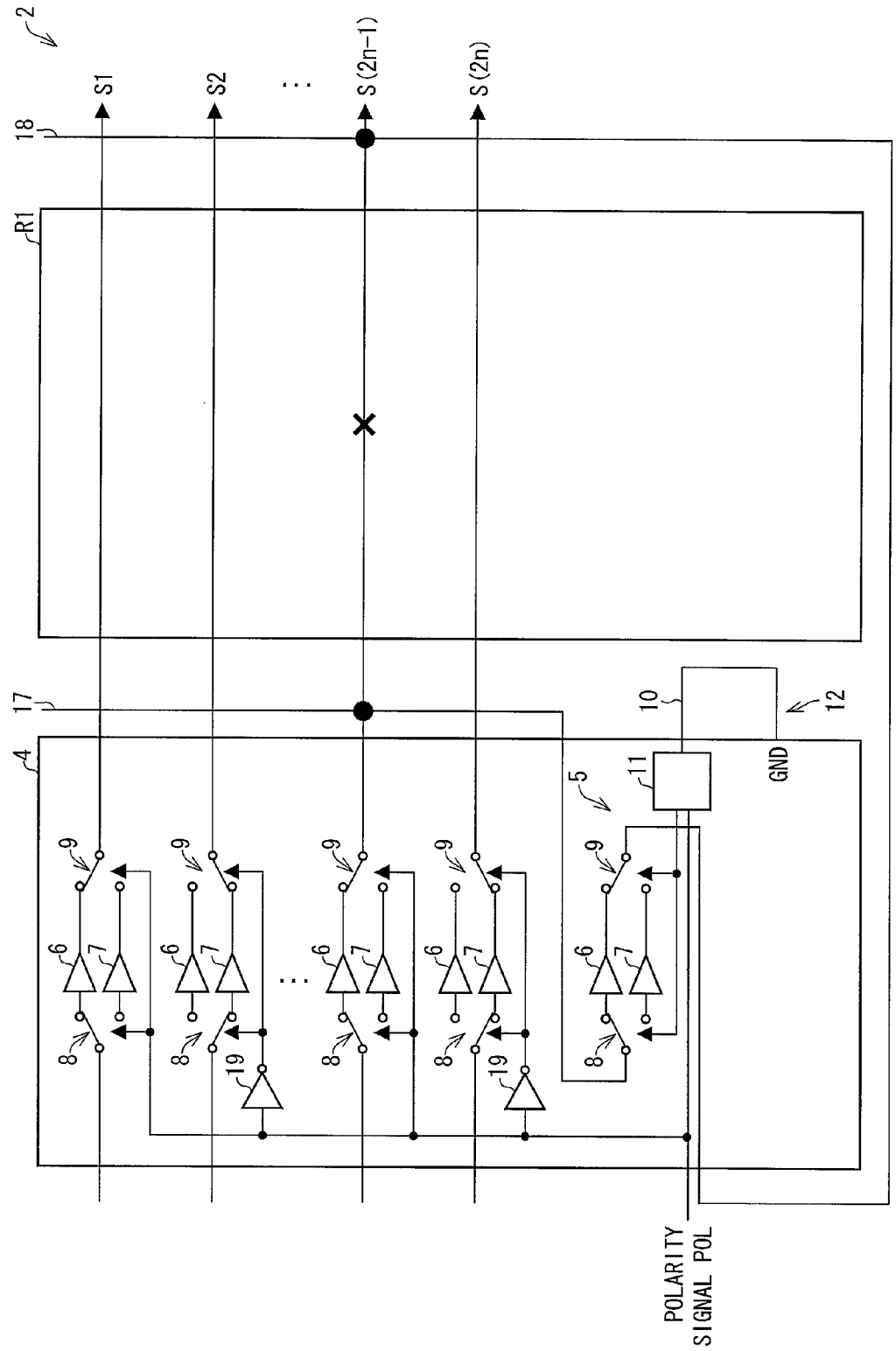

FIG. 5 is a view illustrating how an electric disconnection is repaired which has happened to a data signal line S(2n−1) of the liquid crystal display panel illustrated in FIG. 4.

Figure 6:
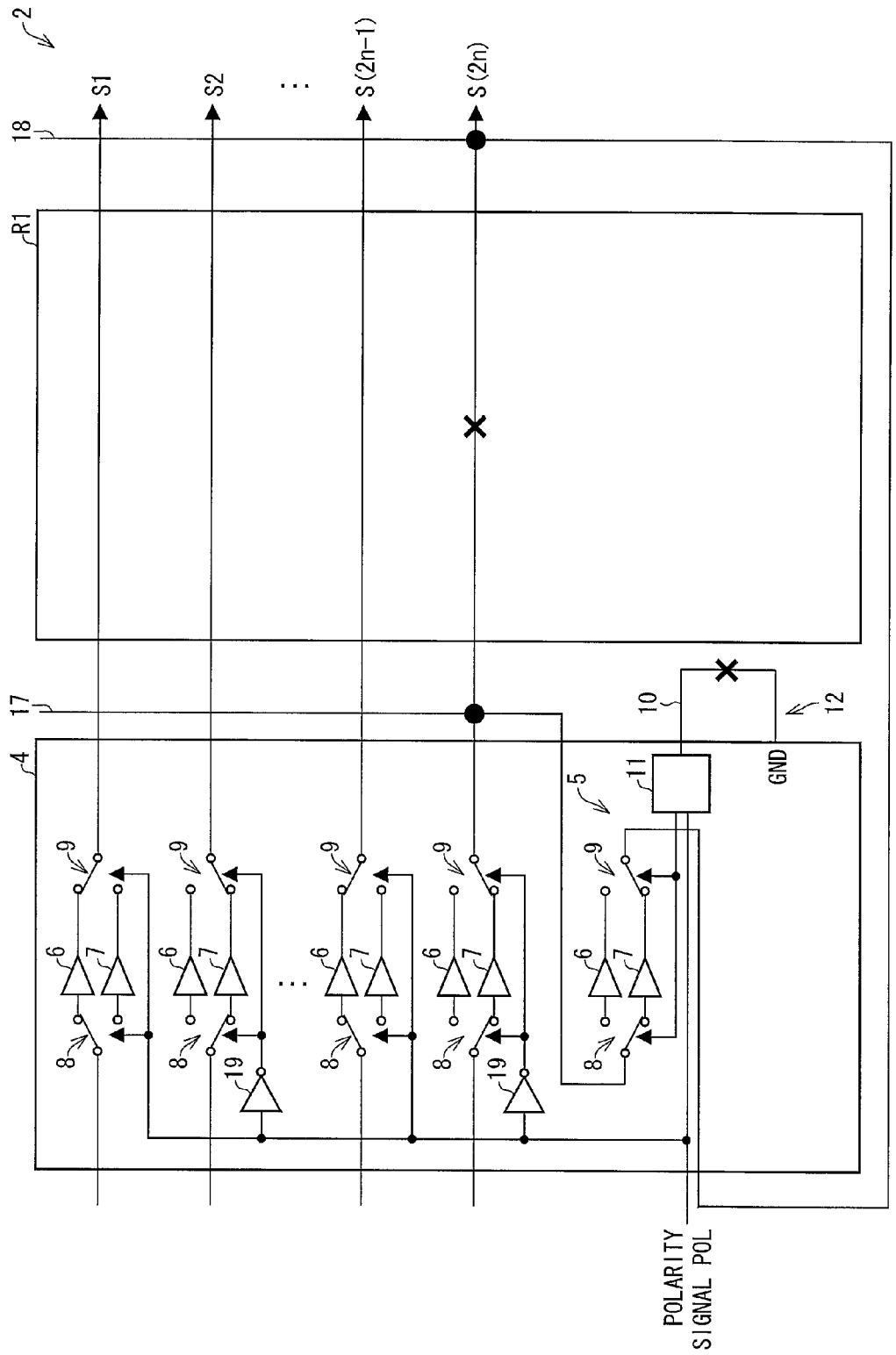

FIG. 6 is a view illustrating how an electric disconnection is repaired which has happened to a data signal line S(2n) of the liquid crystal display panel illustrated in FIG. 4.

Figure 7:
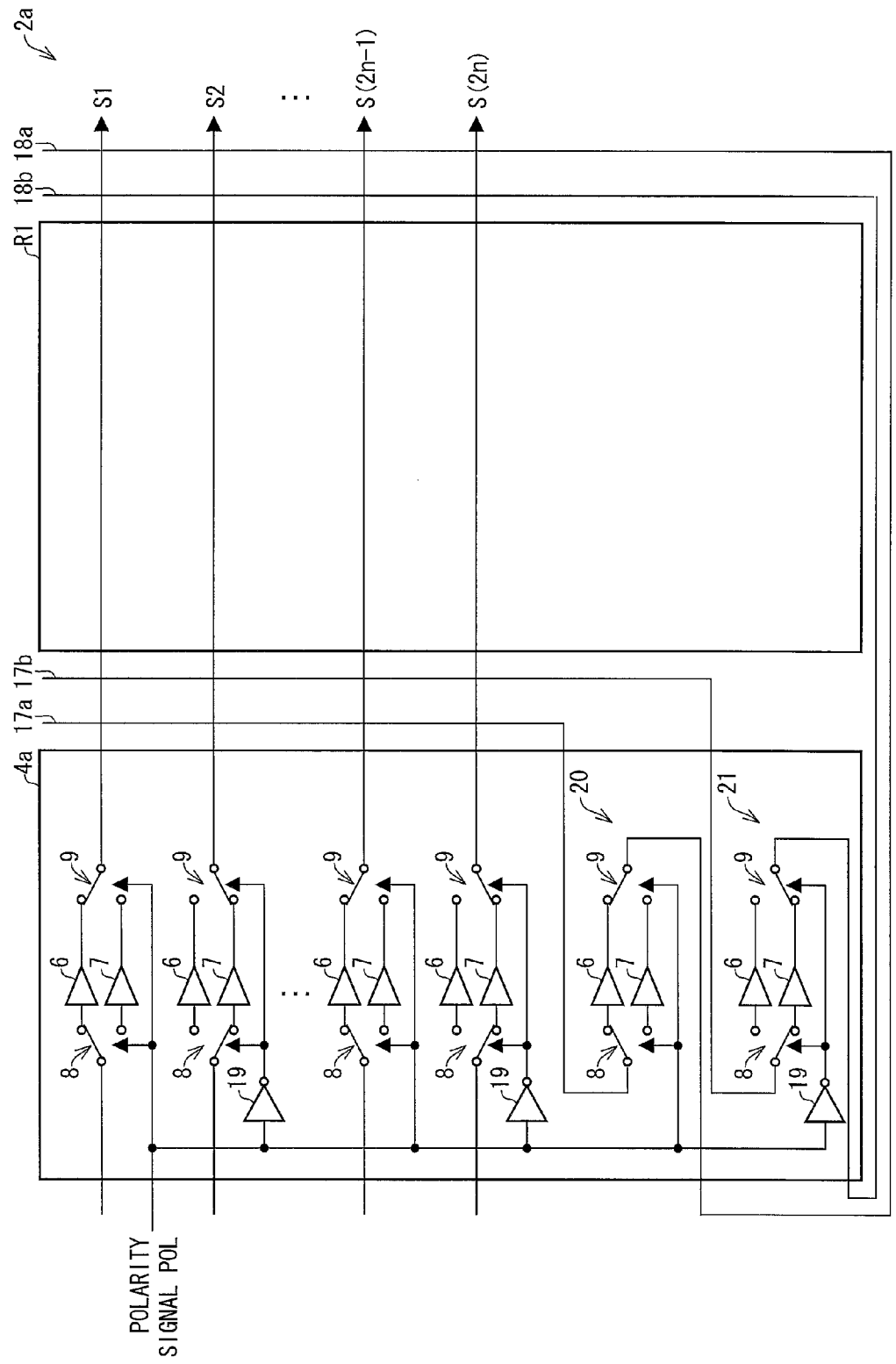

FIG. 7 is a view schematically illustrating a configuration of a liquid crystal display panel that includes two repair amplifier circuits each of which includes no polarity setting section, the liquid crystal display panel being included in a liquid crystal display device of another embodiment of the present invention.

Figure 8:
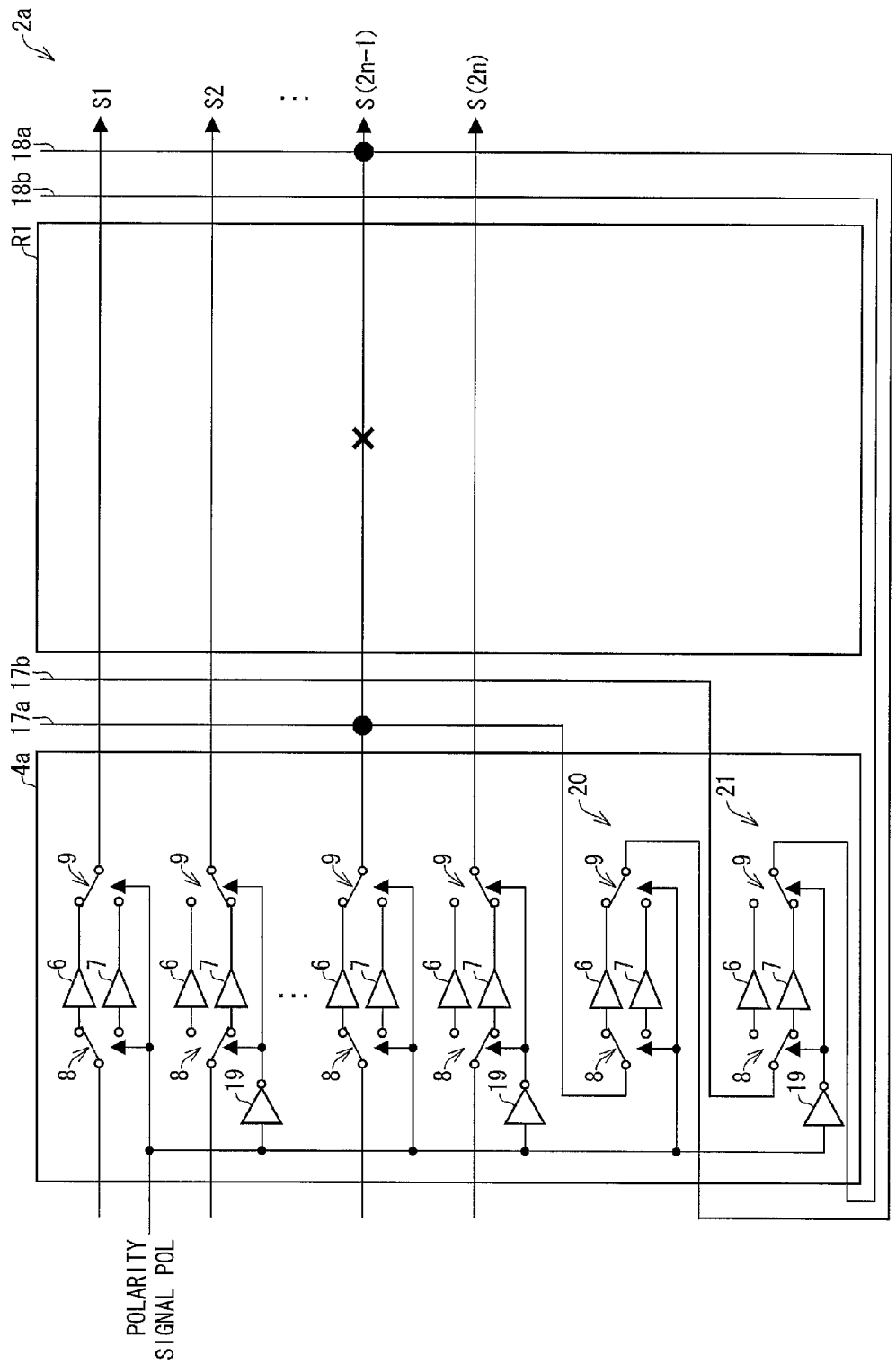

FIG. 8 is a view illustrating how an electric disconnection is repaired which has happened to a data signal line S(2n−1) of the liquid crystal display panel illustrated in FIG. 7.

Figure 9:
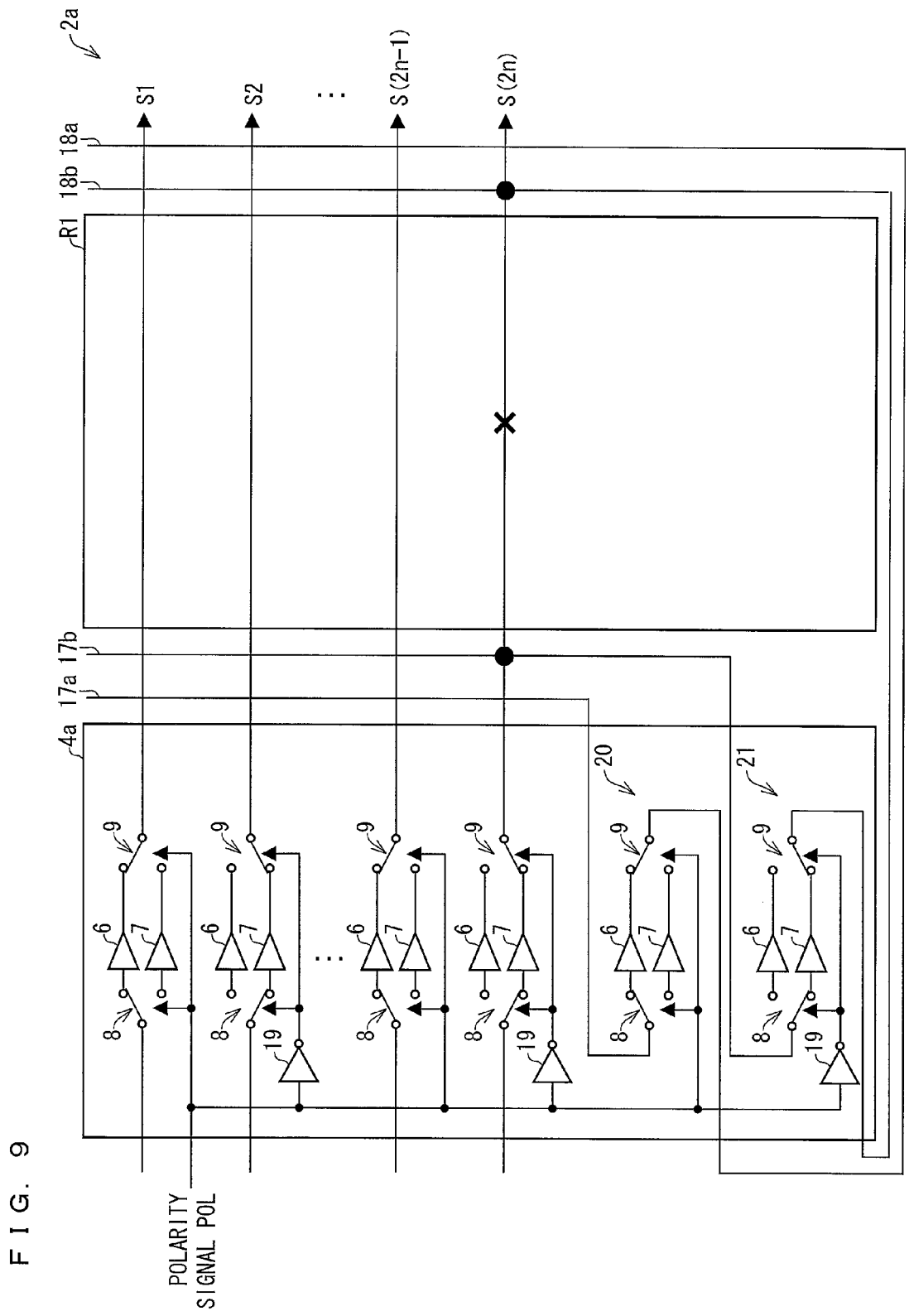

FIG. 9 is a view illustrating how an electric disconnection is repaired which has happened to a data signal line S(2n) of the liquid crystal display panel illustrated in FIG. 7.

Figure 10:
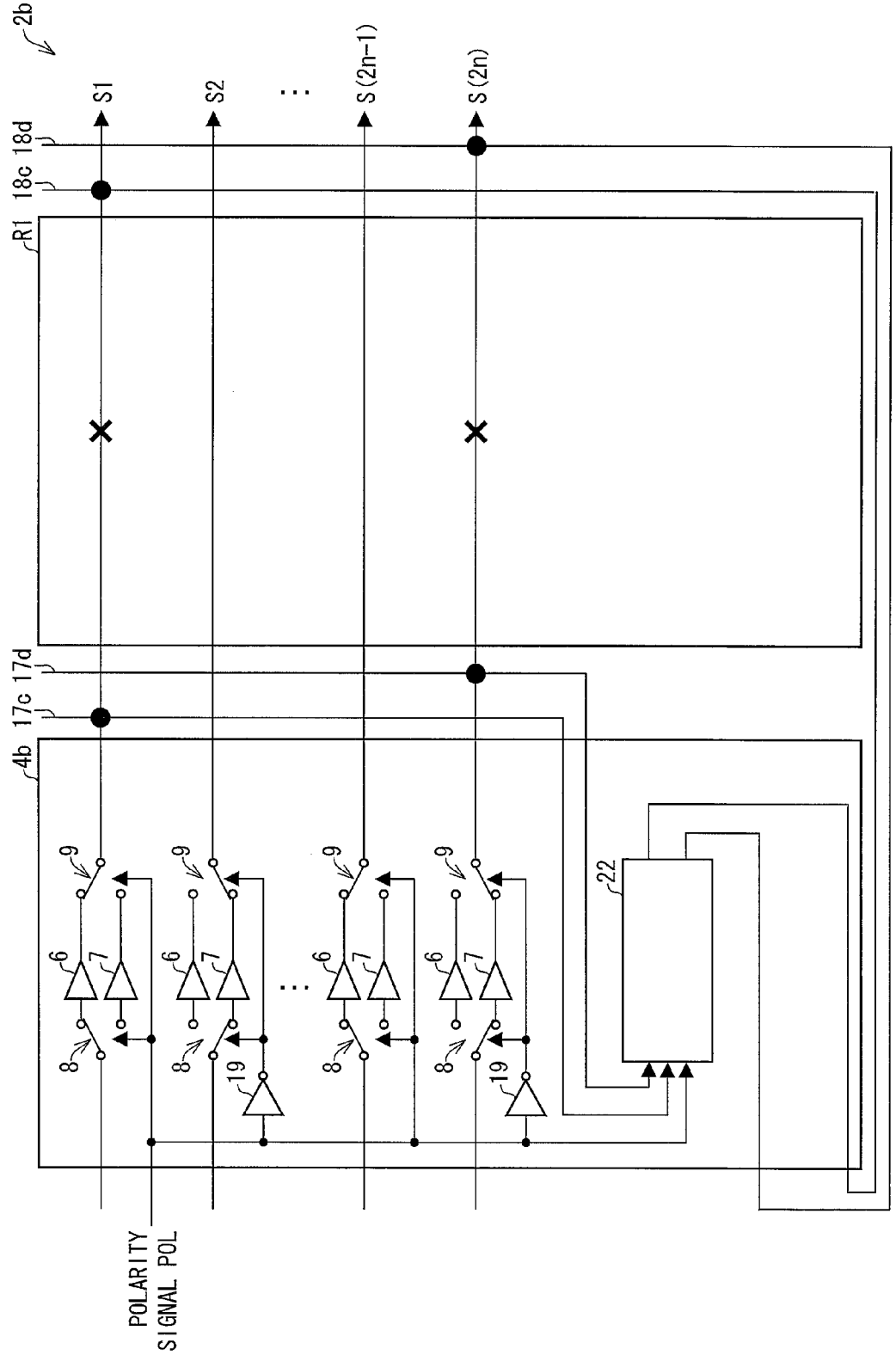

FIG. 10 is a view schematically illustrating a configuration of a liquid crystal display panel that includes a repair amplifier circuit, the liquid crystal display panel being included in a liquid crystal display device of yet another embodiment of the present invention.

Figure 11:
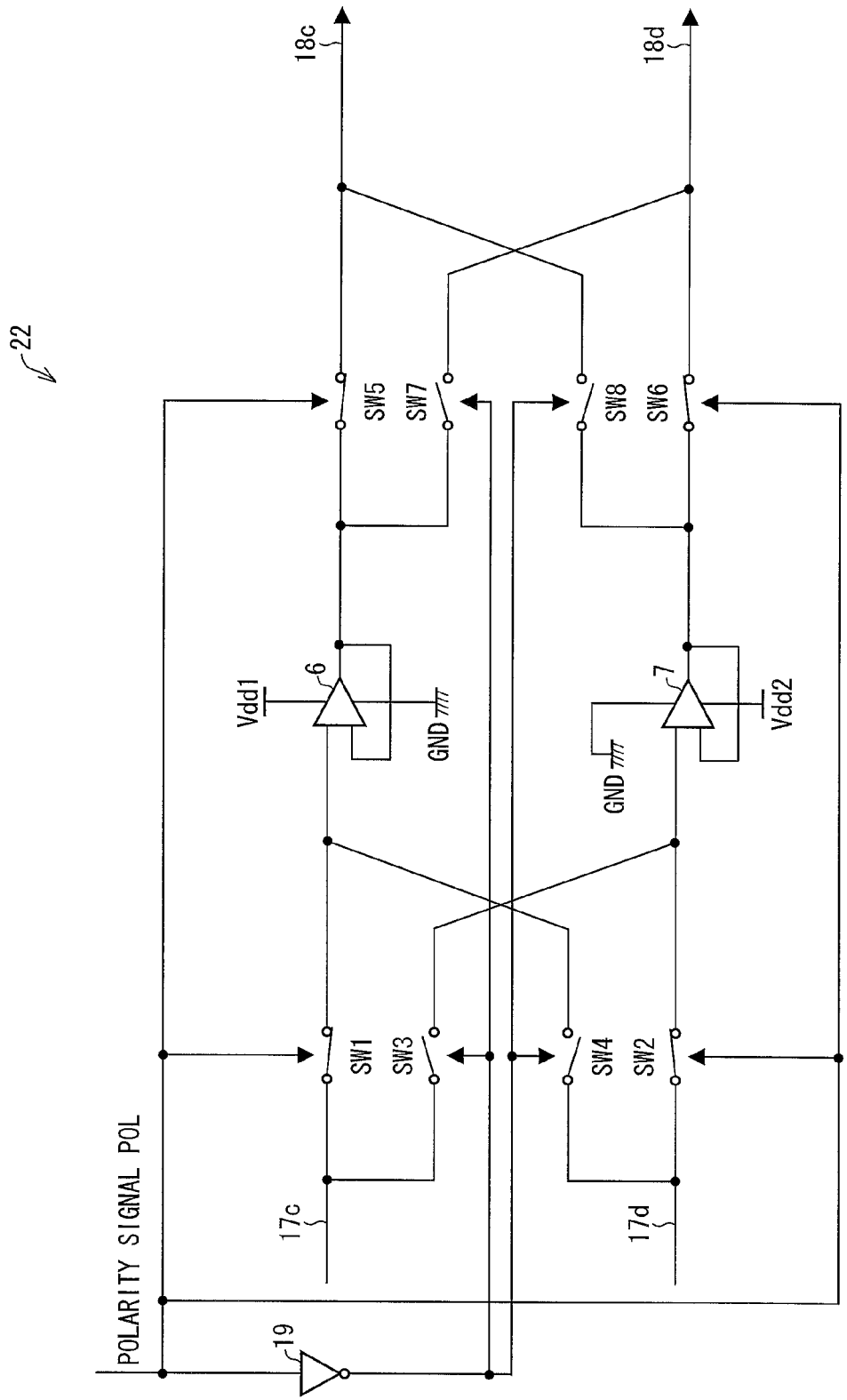

FIG. 11 is a view illustrating a circuit configuration of a repair amplifier circuit that is included in a liquid crystal display device of the yet another embodiment of the present invention.

Figure 12:
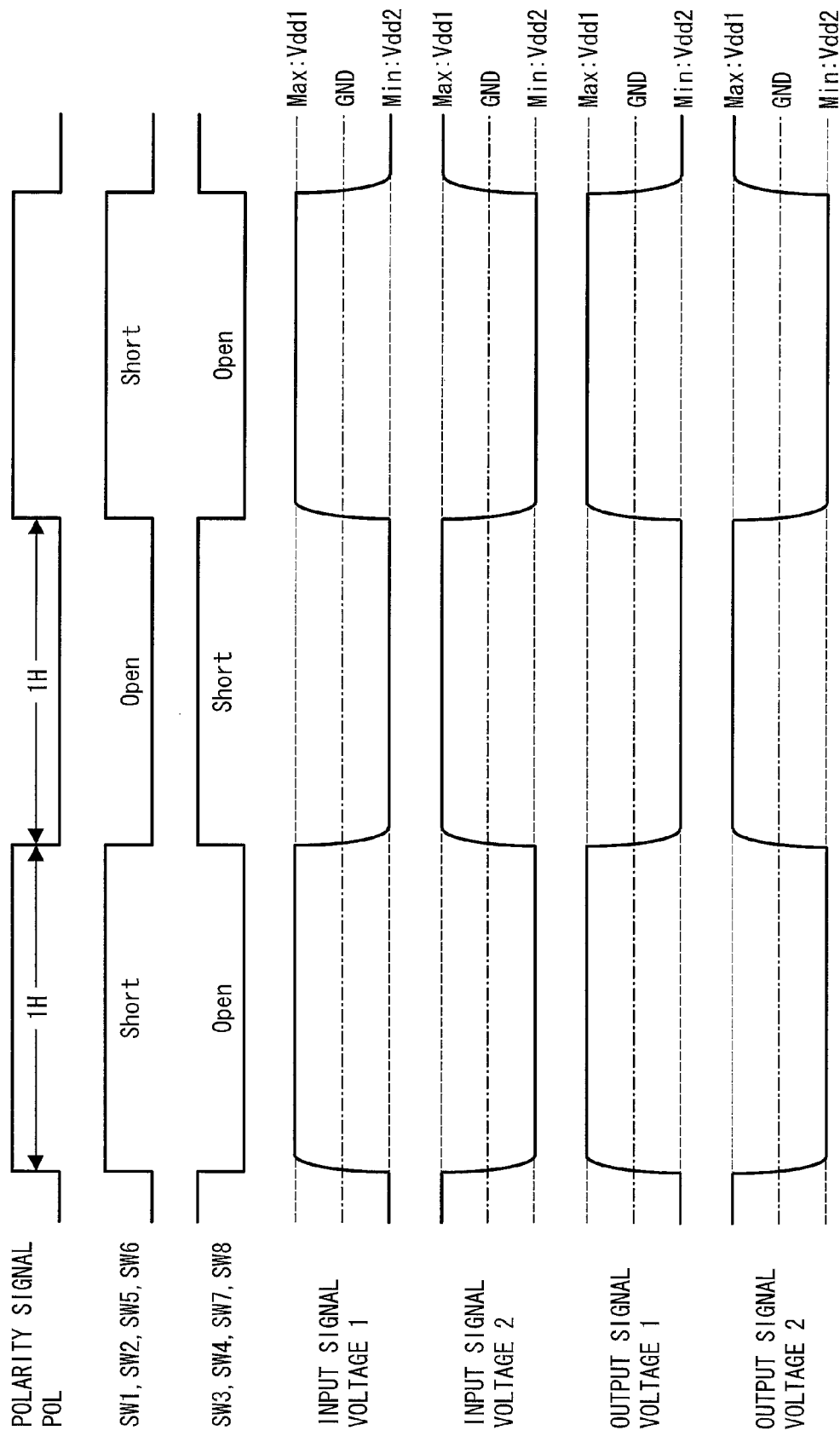

FIG. 12 is a view illustrating a timing chart obtained during driving of the repair amplifier circuit illustrated in FIG. 11.

Figure 13:
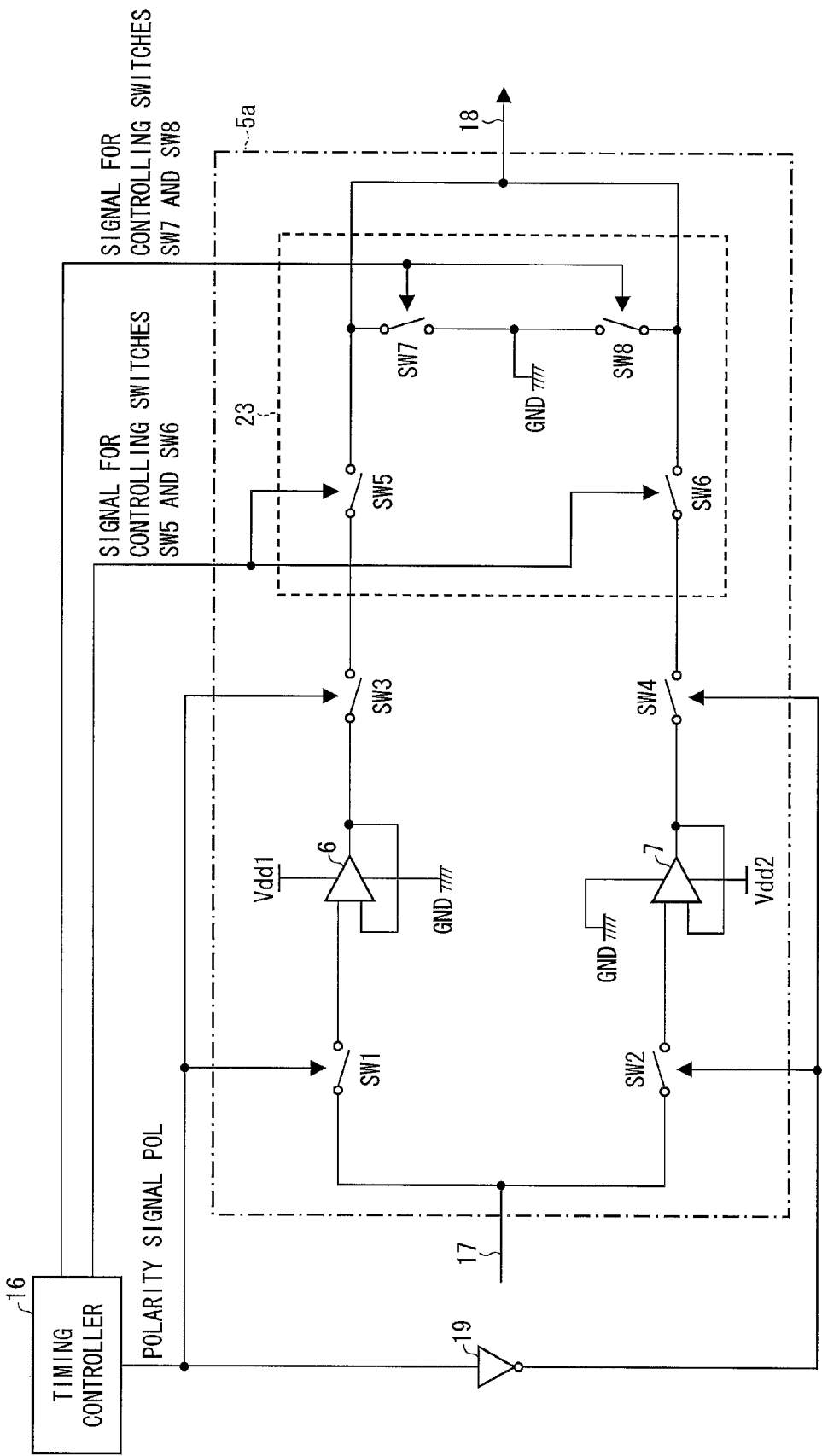

FIG. 13 is a view illustrating a circuit configuration of a repair amplifier circuit that includes a third switch circuit, the repair amplifier circuit being included in a liquid crystal display device of yet another embodiment of the present invention.

Figure 14:
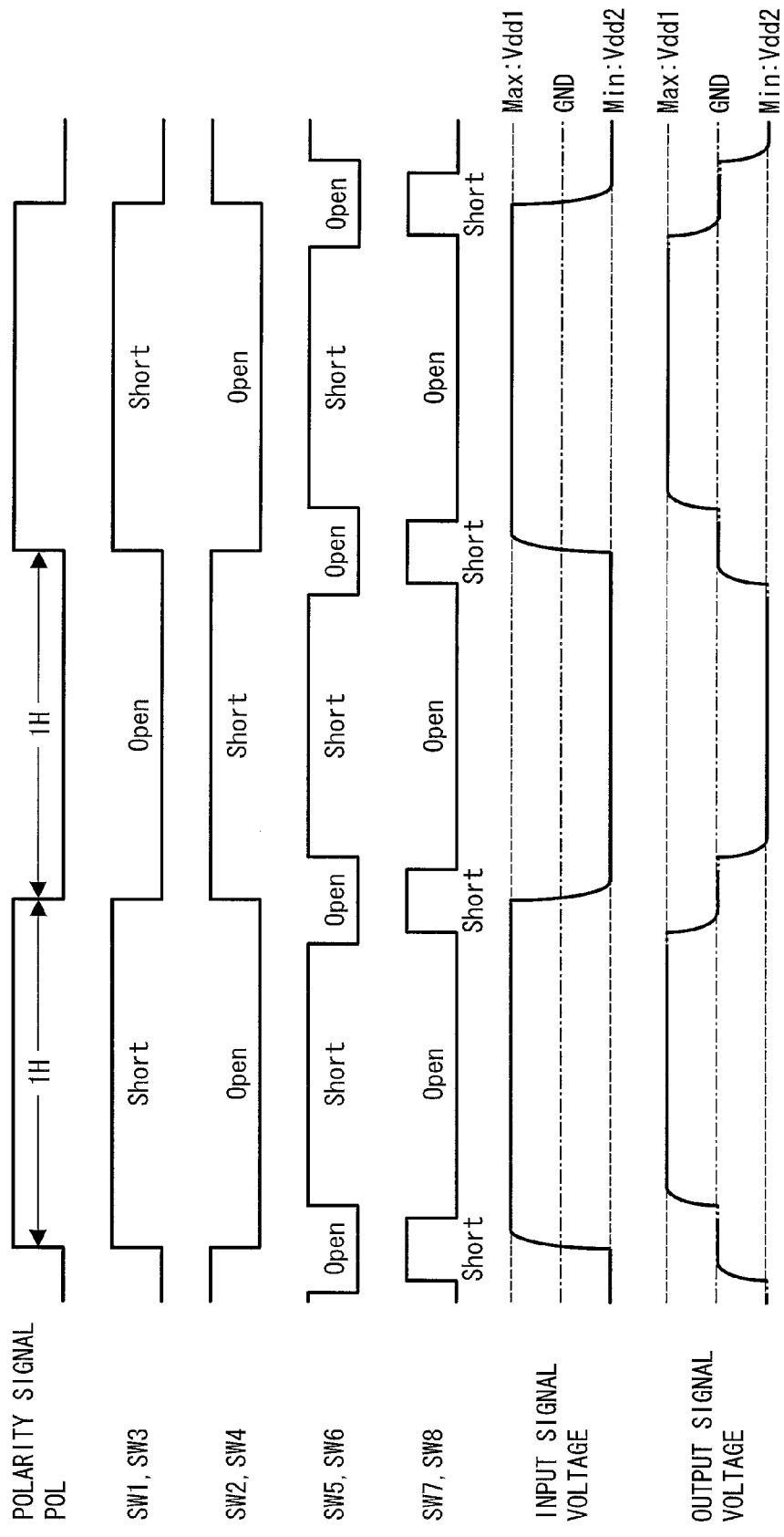

FIG. 14 is a view illustrating a timing chart obtained during driving of the repair amplifier circuit illustrated in FIG. 13.

Figure 15:
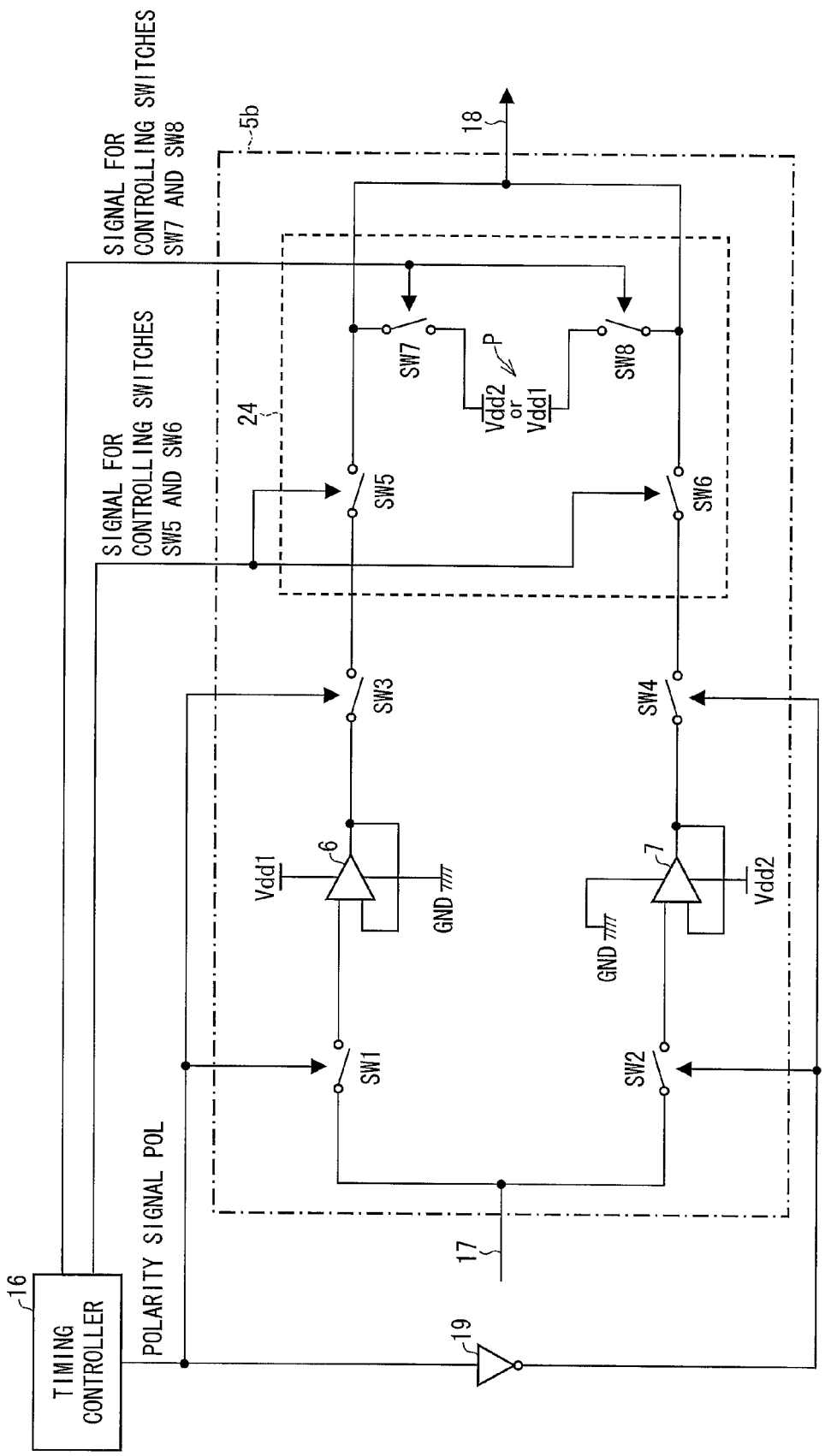

FIG. 15 is a view illustrating a circuit configuration of a repair amplifier circuit that includes another third switch circuit, the repair amplifier circuit being included in a liquid crystal display device of yet another embodiment of the present invention.

Figure 16:
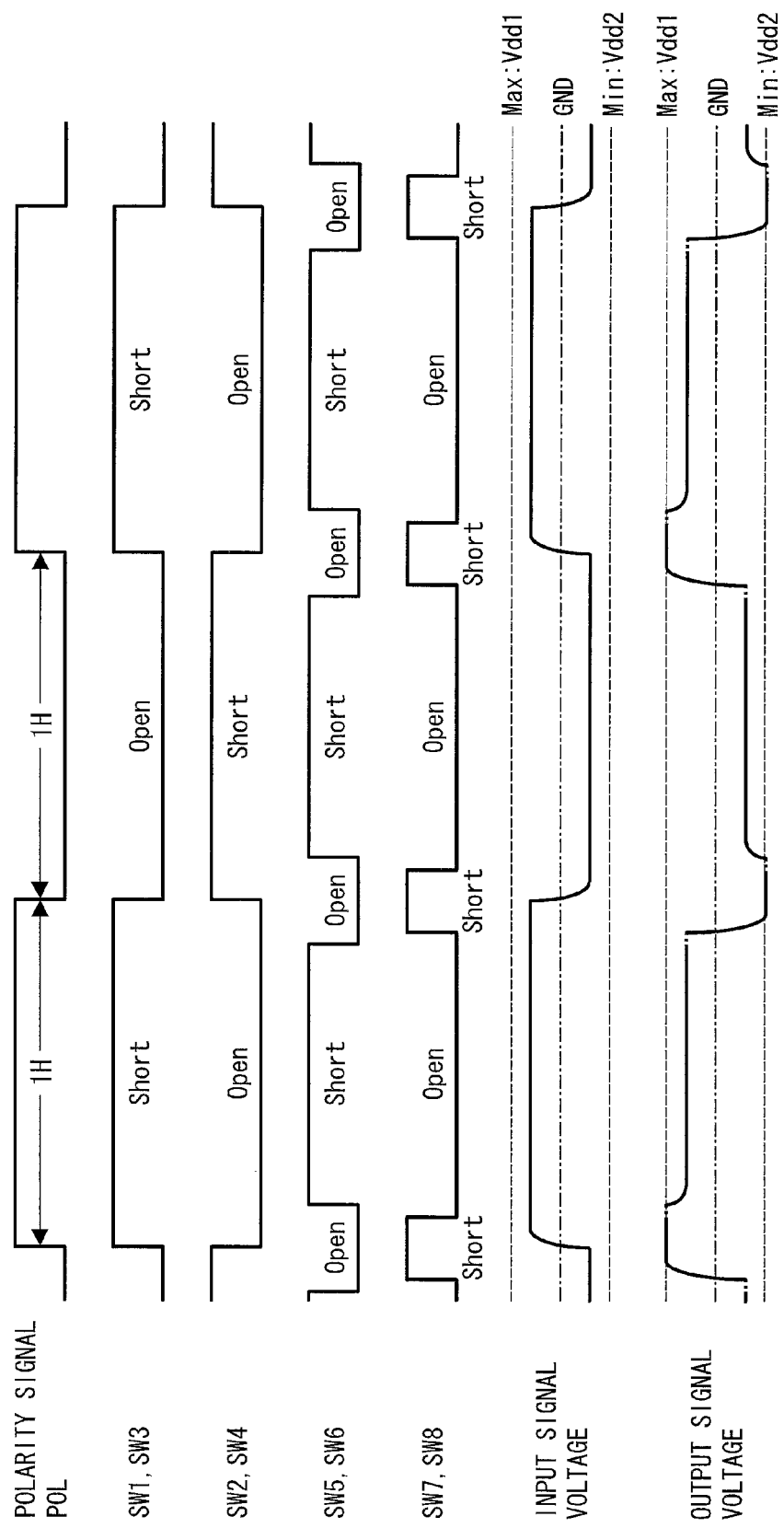

FIG. 16 is a view illustrating a timing chart obtained during driving of the repair amplifier circuit illustrated in FIG. 15.

Figure 17:
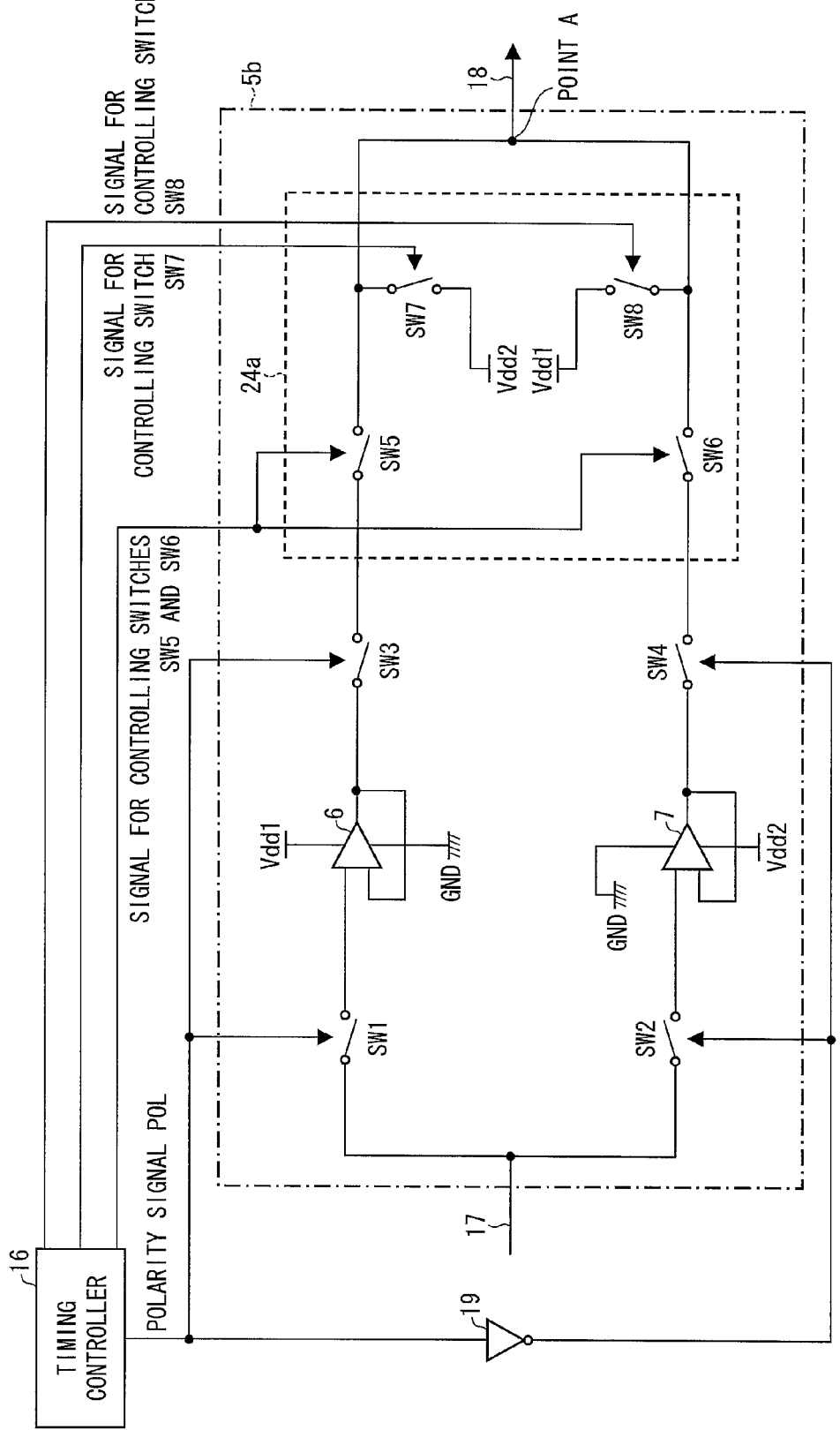

FIG. 17 is a view illustrating a circuit configuration of a repair amplifier circuit that includes yet another third switch circuit, the repair amplifier circuit being included in a liquid crystal display device of yet another embodiment of the present invention.

Figure 18:
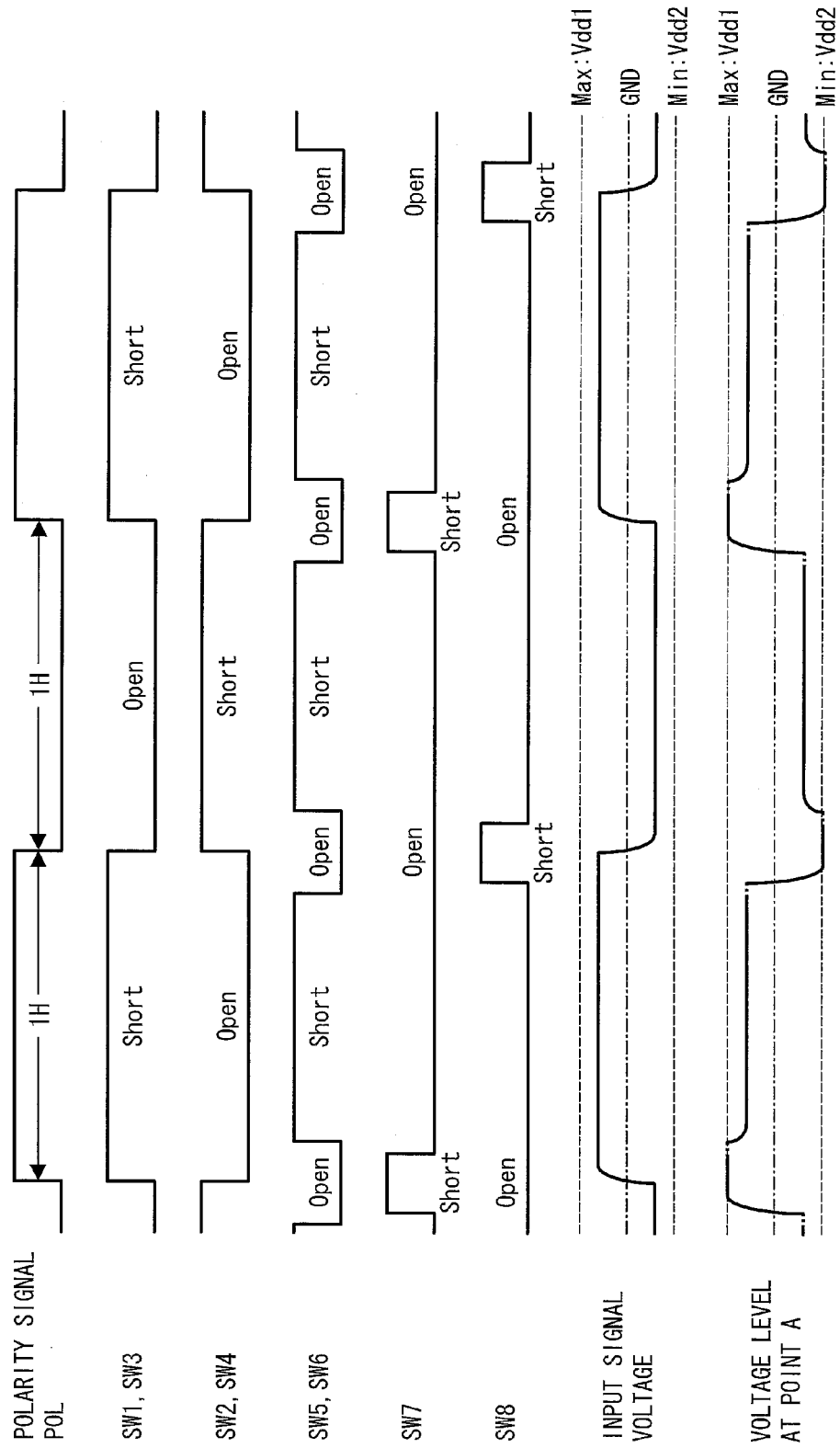

FIG. 18 is a view illustrating a timing chart obtained during driving of the repair amplifier circuit illustrated in FIG. 17.

Figure 19:
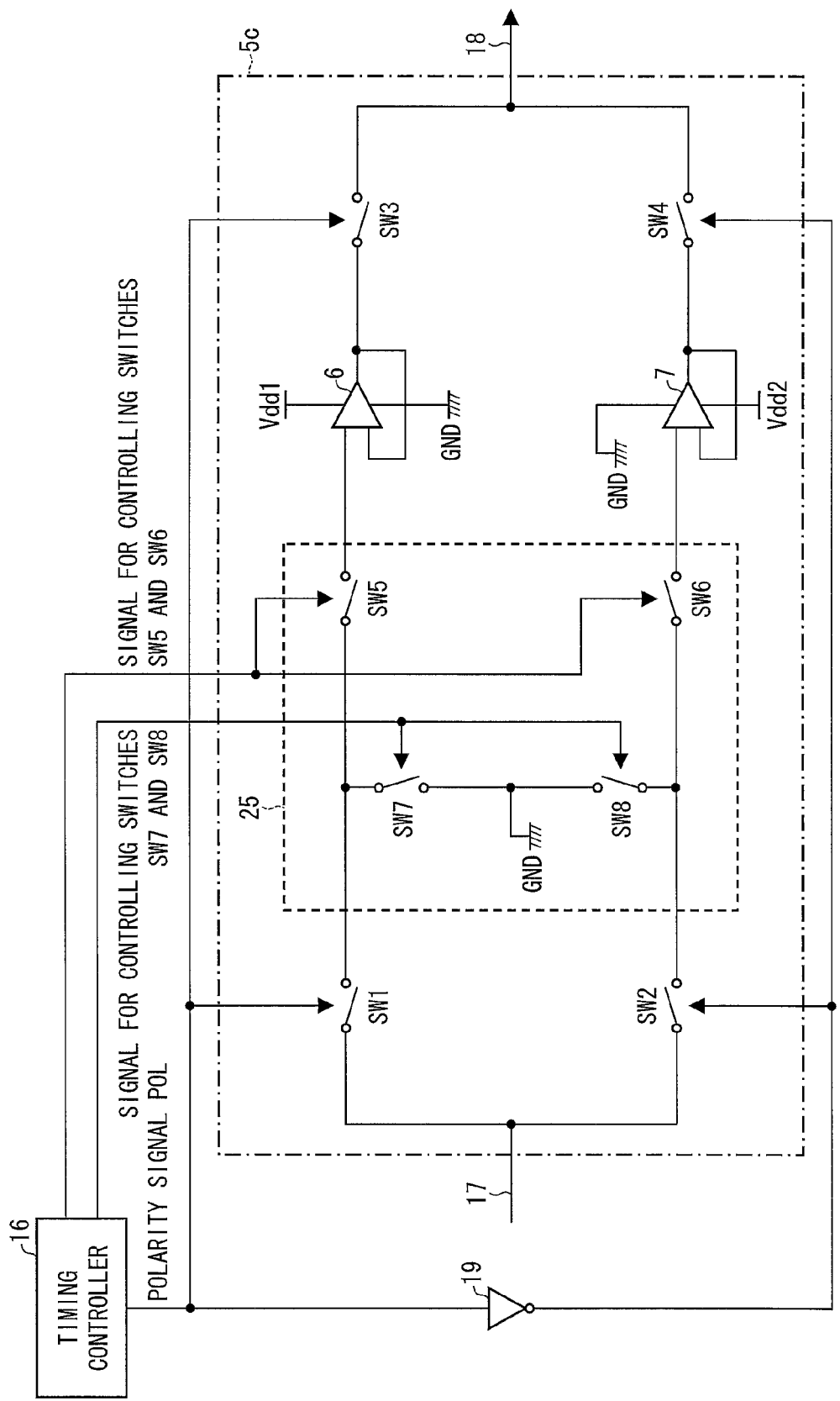

FIG. 19 is a view illustrating a circuit configuration of a repair amplifier circuit that includes a fourth switch circuit, the repair amplifier circuit being included in a liquid crystal display device of yet another embodiment of the present invention.

FIG. 20 is a view illustrating a timing chart obtained during driving of the repair amplifier circuit illustrated in FIG. 19.

FIG. 21 is a view illustrating a circuit configuration of a repair amplifier circuit that includes another fourth switch circuit, the repair amplifier circuit being included in a liquid crystal display device of yet another embodiment of the present invention.

FIG. 22 is a view illustrating a timing chart obtained during driving of the repair amplifier circuit illustrated in FIG. 21.

Figure 23:
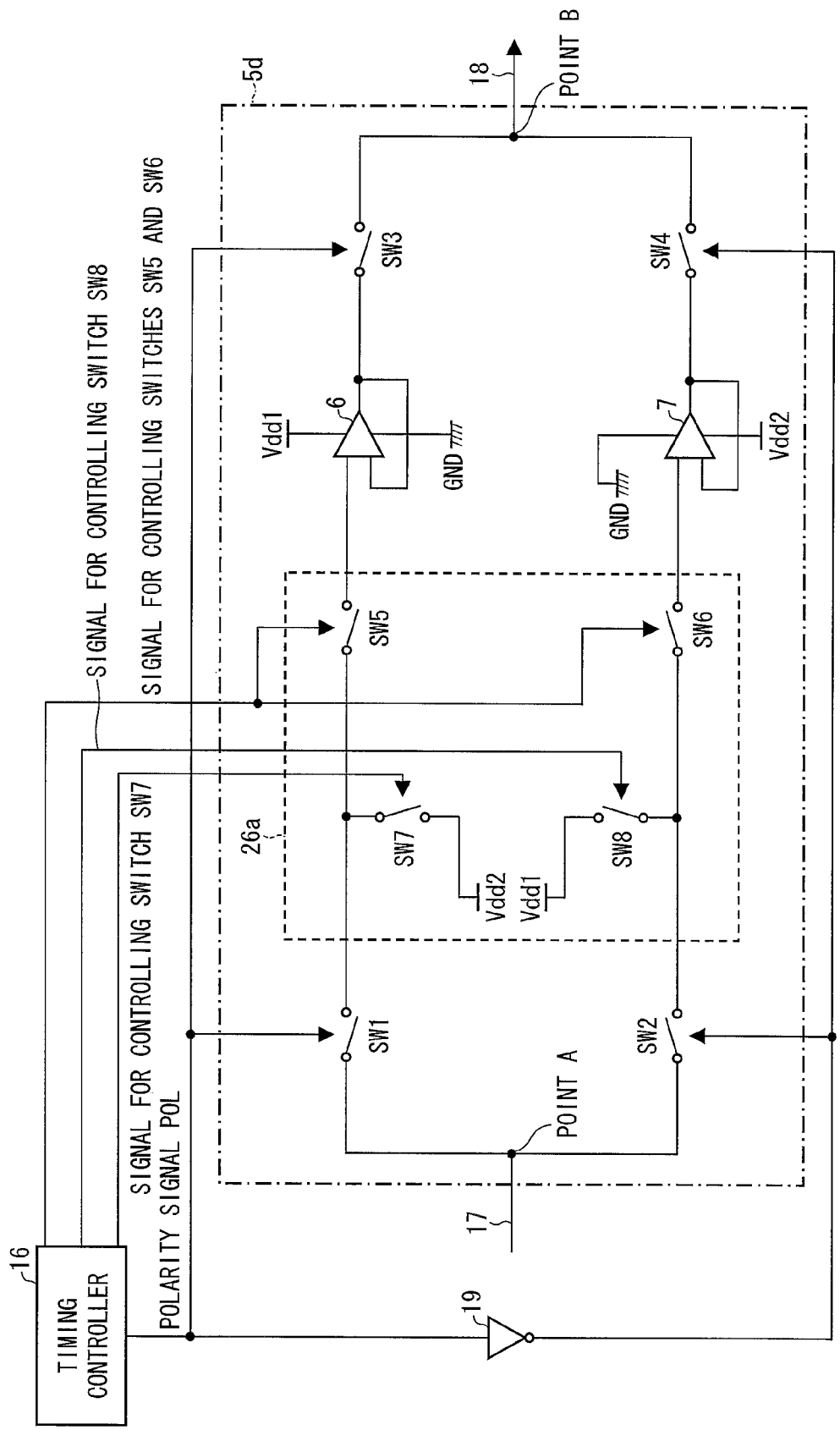

FIG. 23 is a view illustrating a circuit configuration of a repair amplifier circuit that includes yet another fourth switch circuit, the repair amplifier circuit being included in a liquid crystal display device of yet another embodiment of the present invention.

Figure 24:
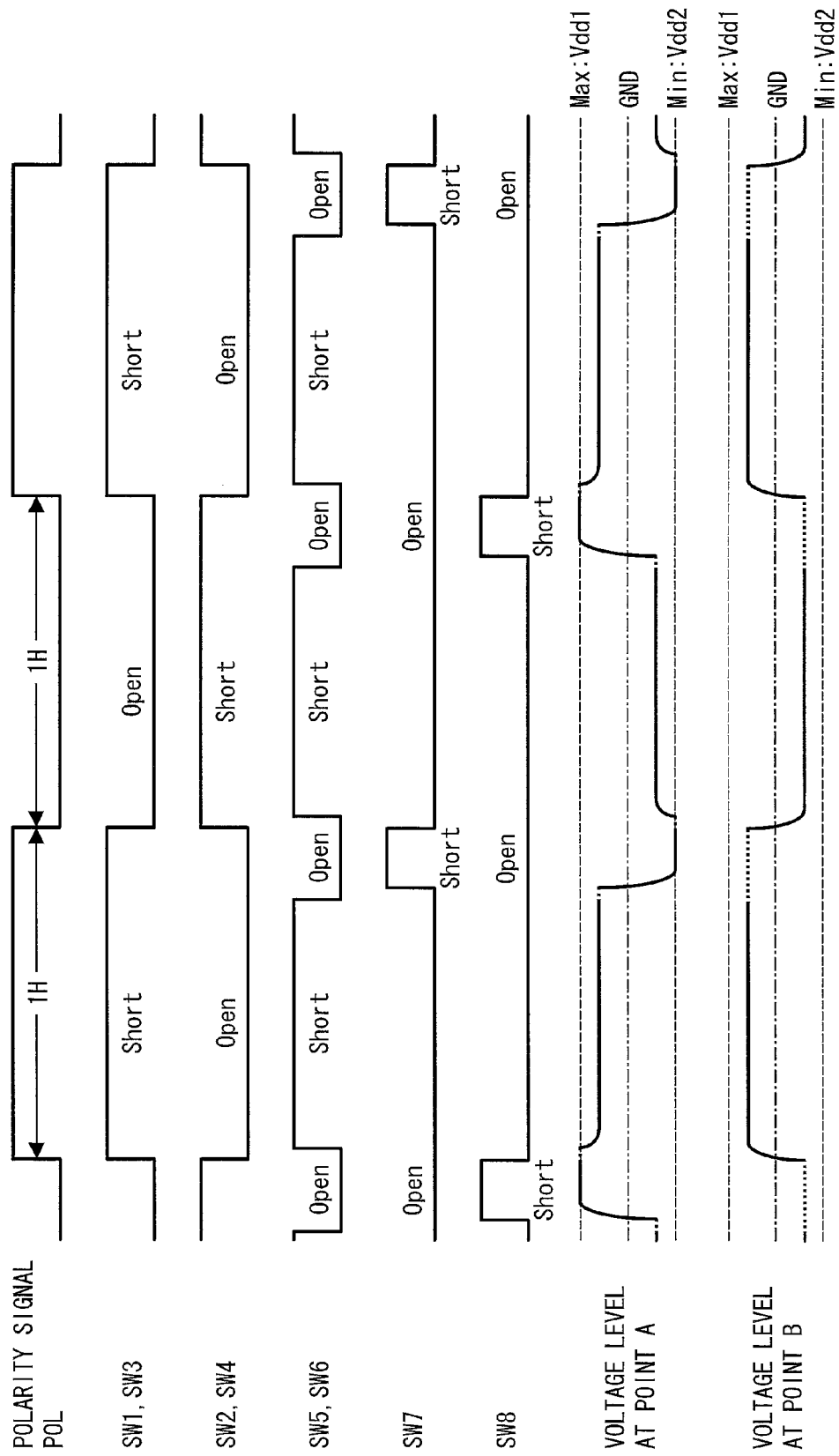

FIG. 24 is a view illustrating a timing chart obtained during driving of the repair amplifier circuit illustrated in FIG. 23.

Figure 25:
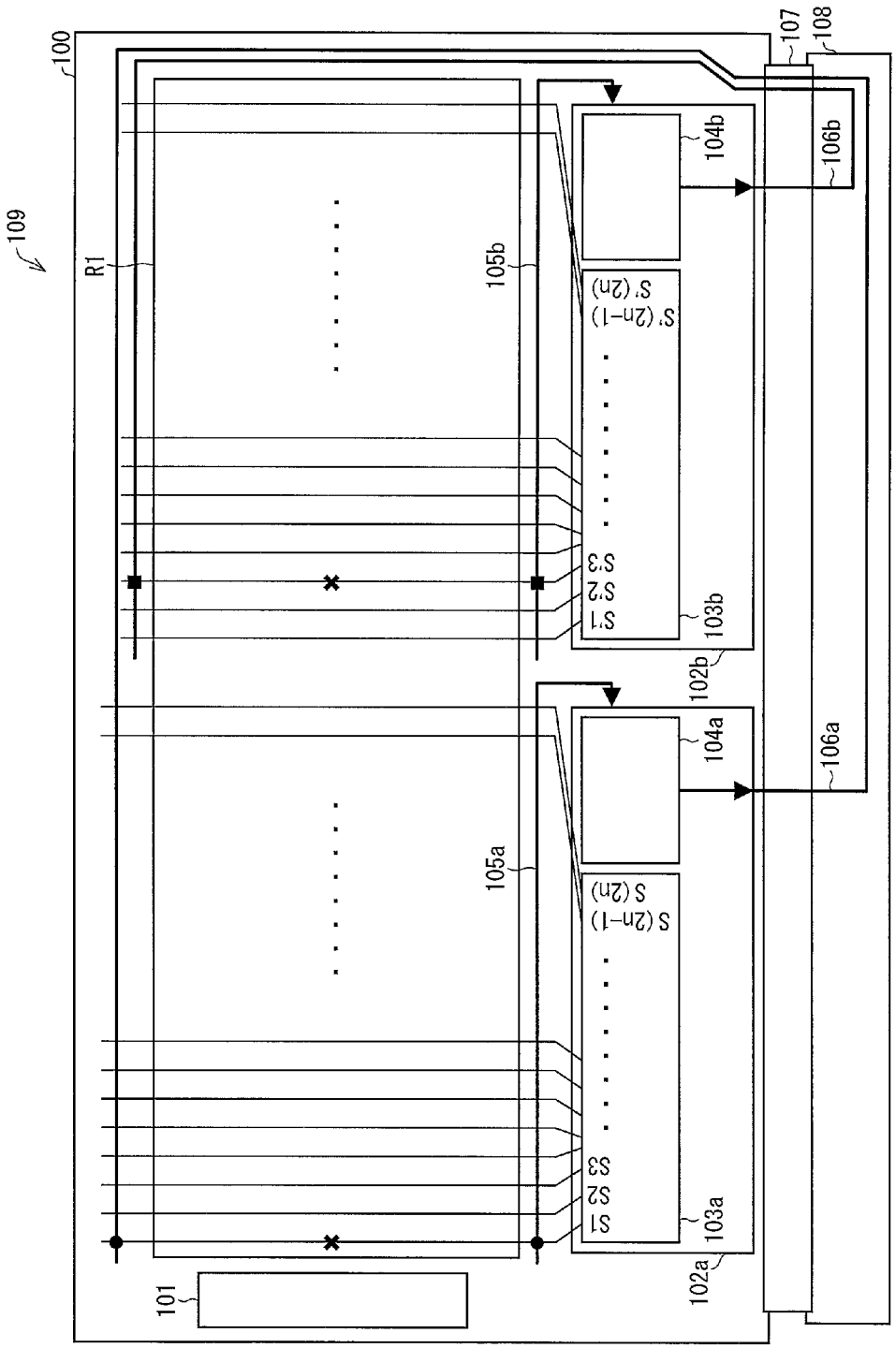

FIG. 25 is a view illustrating a configuration of a conventional liquid crystal display device that includes electric wires and repair circuits which are used to repair a defect, such as electric disconnection of a data signal line, in a case where the defect occurs so that the conventional liquid crystal display device is driven.

Figure 26:
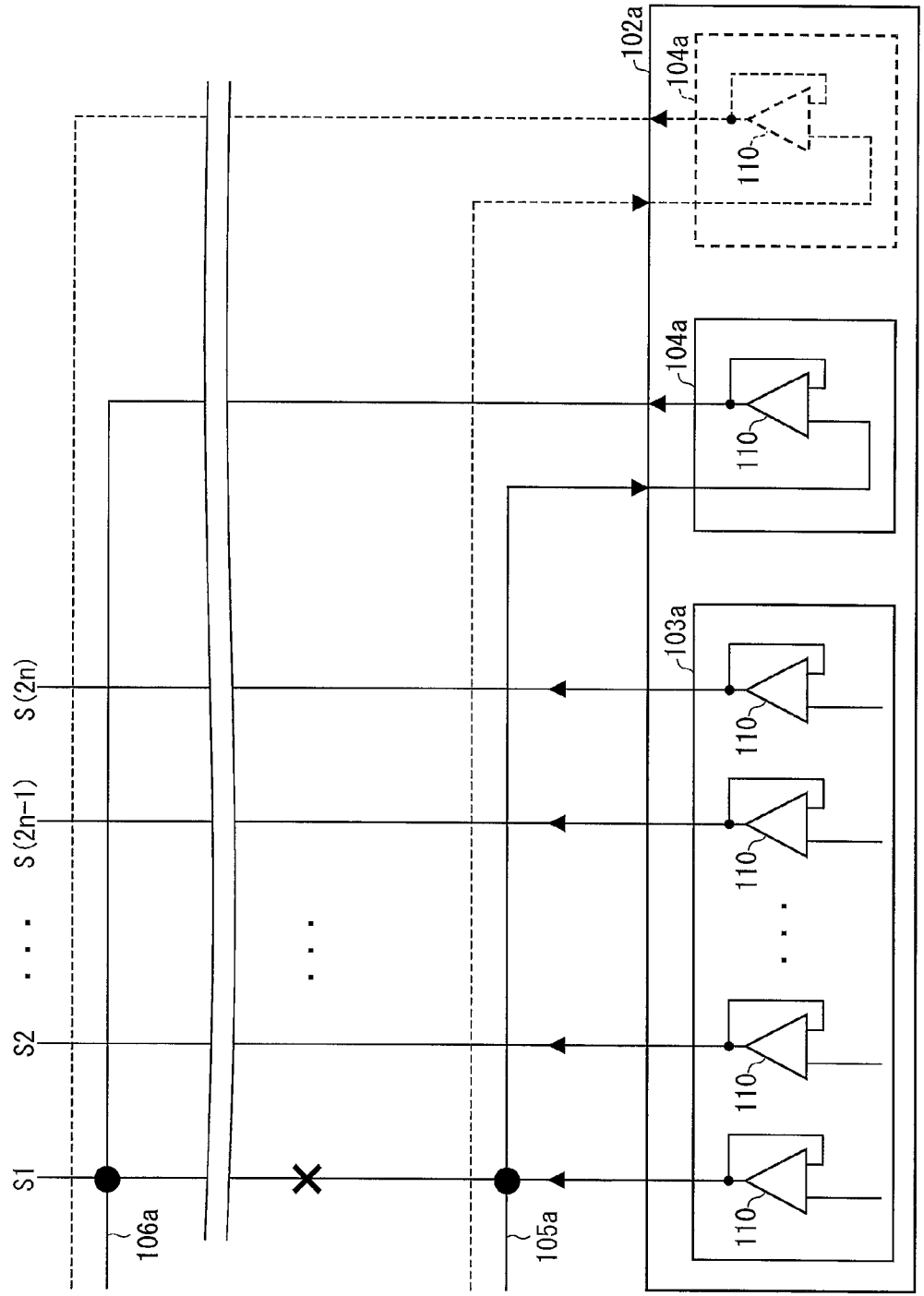

FIG. 26 is a view illustrating a circuit configuration of a conventional data signal line driving circuit.

DESCRIPTION OF EMBODIMENTS

The following description will discuss in detail Embodiments of the present invention with reference to drawings. Note, however, that the dimensions, materials, shapes, relative locations, and the like of components described in the Embodiments are illustrative only, and should not therefore cause the scope of the present invention to be narrowly construed.

Note also that each of the following Embodiments will describe a liquid crystal display device as an example of a display device. Note, however, that the display device is not particularly limited to the liquid crystal display device, provided that the display device carries out display by means of reverse polarity driving.

Embodiment 1

The following description will discuss Embodiment 1 of the present invention with reference to FIGS. 1 through 6.

Figure 1:
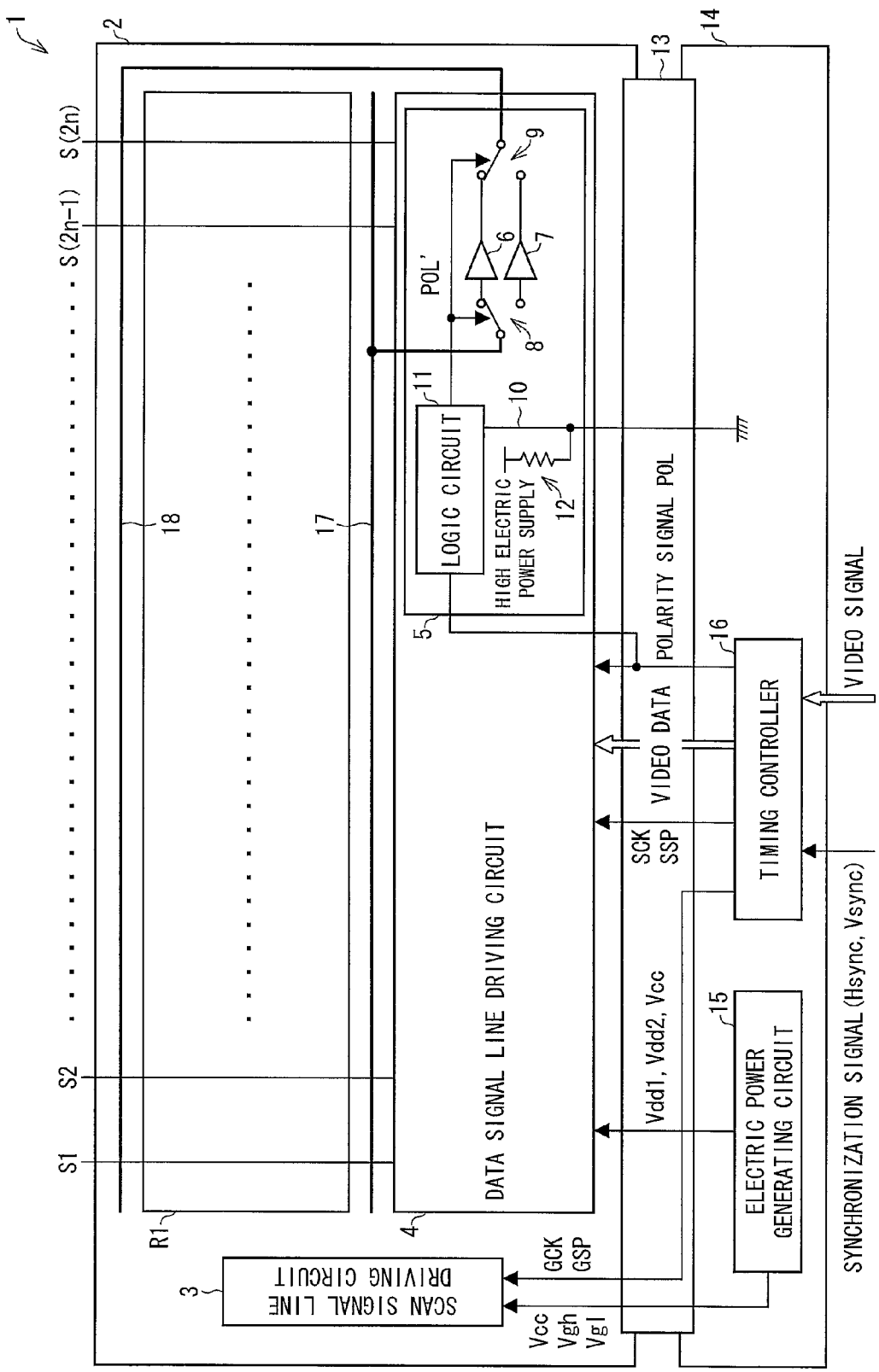
FIG. 1 is a view schematically illustrating a configuration of a liquid crystal display device of an embodiment of the present invention.

FIG. 1 is a view schematically illustrating a configuration of a liquid crystal display device 1.

The liquid crystal display device 1 includes (i) a liquid crystal display panel 2 and (ii) a control substrate 14 that is connected to the liquid crystal display panel 2 via an FPC 13 (see FIG. 1).

The liquid crystal display panel 2 has a display region R1 in which a plurality of pixels (not illustrated) are arranged in a matrix manner. The liquid crystal display panel 2 includes (i) a scan signal line driving circuit (gate driver) 3 for supplying scan signals to a plurality of scan signal lines (not illustrated) and (ii) a data signal line driving circuit (source driver) 4 for supplying data signals to a plurality of data signal lines S1, S2, . . . , and S(2n). The scan signal line driving circuit 3 and the data signal line driving circuit 4 are provided around the display region R1.

In the display region R1, the plurality of scan signal lines and the plurality of data signal lines S1, S2, . . . , and S(2n) intersect with each other (not illustrated). In the vicinity of intersections where the plurality of scan signal lines and the plurality of data signal lines S1, S2, . . . , and S(2n) intersect with each other, there are provided respective switching elements (not illustrated), such as TFTs, which are electrically connected to pixel electrodes of the respective plurality of pixels.

The data signal line driving circuit 4 includes a repair amplifier circuit 5 (see FIG. 1) which is used to repair electric disconnection of the data signal lines S1, S2, . . . , and S(2n) in a case where the electric disconnection occurs so that the liquid crystal display device 1 is driven. The repair amplifier circuit 5 is electrically connected to a first auxiliary wire 17 and a second auxiliary wire 18 which are used to repair the electric disconnection.

The first auxiliary wire 17 is provided in a region between the display region R1 and the data signal line driving circuit 4 so as to intersect end parts of the respective data signal lines S1, S2, ..., and S(2n), which end parts are on a side of the data signal line driving circuit 4. The second auxiliary wire 18 is provided so as to (i) extend to a region other than the display region R1 and (ii) intersect the other end parts of the respective data signal lines S1, S2, ..., and S(2n).

The repair amplifier circuit 5 includes a positive-polarity amplifier circuit 6 and a negative-polarity amplifier circuit 7 (see FIG. 1). The positive-polarity amplifier circuit 6 and the negative-polarity amplifier circuit 7 are connected (i) to the first auxiliary wire 17 via a switch section (first switch circuit) 8 and (ii) to the second auxiliary wire 18 via a switch section (second switch circuit) 9 (see FIG. 1).

The repair amplifier circuit 5 further includes a polarity setting section 12 that includes a logic circuit 11.

The logic circuit 11 is electrically connected to an electric wire 10 to which a High electric power supply voltage and a ground voltage GND are supplied. Depending on whether a voltage of the electric wire 10 is high or low, it is determined whether the logic circuit 11 outputs, to the switch sections 8 and 9 as a polarity signal POL', a polarity signal POL as it is or a reversed polarity signal POL.

The switch sections 8 and 9 are switched in response to the polarity signal POL' which has been supplied from the logic circuit 11.

According to Embodiment 1, specifically, in response to a high-level polarity signal POL' supplied from the logic circuit 11, the switch sections 8 and 9 are electrically connected to the positive-polarity amplifier circuit 6. In contrast, in response to a low-level polarity signal POL' supplied from the logic circuit 11, the switch sections 8 and 9 are electrically connected to the negative-polarity amplifier circuit 7. Embodiment 1 is, however, not limited to this.

Note that according to Embodiment 1, the liquid crystal display device 1 carries out display by use of a dot reversal driving method in which any adjacent data signal lines have reverse polarities. The polarity setting section 12 is therefore provided so that any of adjacent data signal lines, which have the respective reverse polarities, can be repaired. Note, however, that no polarity setting section 12 needs to be provided in a case where the liquid crystal display device 1 carries out display by use of a driving method, such as a frame reversal driving method or a line reversal driving method, in which any adjacent data signal lines have identical polarities.

The control substrate 14 includes an electric power generating circuit 15 and a timing controller 16.

The electric power generating circuit 15 generates voltages (i.e., Vdd1, Vdd2, Vcc, Vgh, and Vgl) required for the circuits in the liquid crystal display device 1 to operate. The electric power generating circuit 15 (i) supplies Vcc, Vgh, and Vgl to the scan line driving circuit 3, (ii) supplies Vdd1, Vdd2, and Vcc to the data signal line driving circuit 4, and (iii) supplies Vcc to the timing controller 16.

The timing controller 16 also receives a video signal and synchronization signals Hsync and Vsync, which are externally supplied.

In response to the externally supplied signals, the timing controller 16 (i) generates gate clocks GCK and gate start pulses GSP, and then supplies the gate clocks GCK and the gate start pulses GSP to the scan line driving circuit 3 and (ii) generates source clocks SCK and source start pulses SSP, and then supplies the source clocks SCK and the source start pulses SSP to the data signal line driving circuit 4. The gate clocks GCK, the gate start pulses GSP, the source clocks SCK, and the source start pulses SSP serve as video synchronization signals in synchronization with which the circuits operate. In response to the video signals, the timing controller 16 also generates video data, and then supplies the video data to the data signal line driving circuit 4.

The timing controller 16 further supplies a polarity signal POL to the data signal line driving circuit 4 and the repair amplifier circuit 5.

Figure 2:
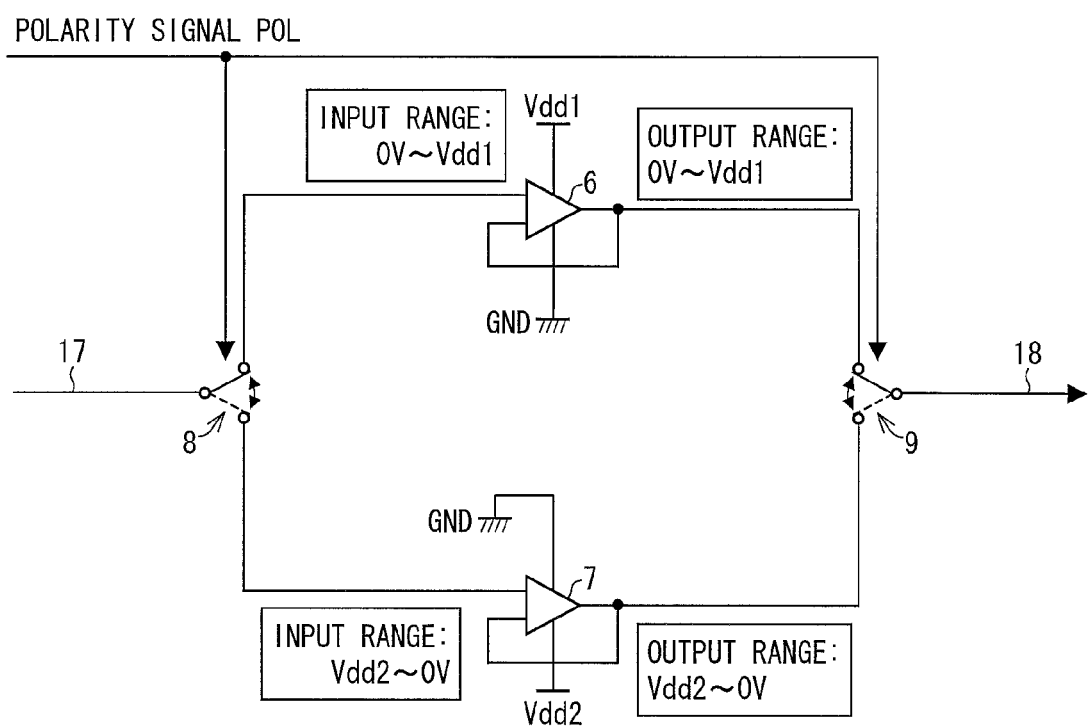
FIG. 2 is a view illustrating a circuit configuration of a repair amplifier circuit (including no polarity setting section) that is included in the liquid crystal display device of the embodiment of the present invention.

FIG. 2 is a view illustrating a circuit configuration of the repair amplifier circuit 5 except for the polarity setting section 12.

As illustrated in FIG. 2, (i) the positive-polarity amplifier circuit 6 receives a positive power supply voltage Vdd1 which has been generated by the electric power generating circuit 15 and (ii) the negative-polarity amplifier circuit 7 receives a negative power supply voltage Vdd2 which has been generated by the electric power generating circuit 15.

A ground voltage GND is supplied, as a power-supply voltage, to each of the positive-polarity amplifier circuit 6 and the negative-polarity amplifier circuit 7.

Therefore, (i) a voltage to be supplied to or outputted from the positive-polarity amplifier circuit 6 falls within a range from 0 V (zero volt) to Vdd1 and (ii) a voltage to be supplied to or outputted from the negative-polarity amplifier circuit 7 falls within a range from Vdd2 to 0 V (zero volt).

(a) of FIG. 3 is a view illustrating a circuit configuration of a repair amplifier circuit 104a that is included in a conventional liquid crystal display device 109 illustrated in FIG. 25.

As illustrated in (a) of FIG. 3, (i) a ground voltage GND and a power supply voltage Vdd0 are supplied, as respective power-supply voltages, to an analog amplifier 110 included in the repair amplifier circuit 104a.

Conventionally, the power supply voltage Vdd0 was 12 V, and therefore a voltage to be supplied to or outputted from the analog amplifier 110 fell within a range from 0 V to 12 V. This required the analog amplifier 110 to have a high withstand voltage.

This caused the foregoing problems that the analog amplifier 110 (i) became relatively large in size and (ii) consumed more electric power.

On the other hand, according to Embodiment 1, the repair amplifier circuit 5 includes the positive-polarity amplifier circuit 6 and the negative-polarity amplifier circuit 7 (see FIG. 2), and each of (i) the voltage Vdd1 supplied to the positive-polarity amplifier circuit 6 and (ii) the voltage Vdd2 supplied to the negative-polarity amplifier circuit 7 is set to an absolute value of a voltage (6 V) that is approximately half of the power supply voltage Vdd0 (12 V) supplied to the conventional analog amplifier 110.

Note that, according to Embodiment 1, the positive power supply voltage Vdd1 and the negative power supply voltage Vdd2 are set to be identical so as to simplify a circuit configuration of a booster circuit in the electric power generating circuit 15. Note, however, that Embodiment 1 is not limited to such. No problem is caused even if the absolute value of one of the positive power supply voltage Vdd1 and the negative power supply voltage Vdd2 is larger or smaller than the other of the positive power supply voltage Vdd1 and the negative power supply voltage Vdd2.

Note also that even if the positive power supply voltage Vdd1 and the negative power supply voltage Vdd2 do not have identical voltages, the circuit configuration of the booster circuit can be simplified, provided that a difference in absolute value between the positive power supply voltage Vdd1 and the negative power supply voltage Vdd2 is not more than 0.5 V.

Note also that, according to Embodiment 1, a ground voltage GND is supplied, as a power-supply voltage, to each of the positive-polarity amplifier circuit 6 and the negative-polarity amplifier circuit 7. Embodiment 1 is, however, not limited to this. An alternative circuit configuration can be employed in which (i) the positive power supply voltage Vdd1 and a voltage Vdd3, that is lower than the positive power supply voltage Vdd1, are supplied to the positive-polarity amplifier circuit 6 and (ii) the negative power supply voltage Vdd2 and a voltage Vdd4, that is higher than the negative power supply voltage Vdd2, are supplied to the negative-polarity amplifier circuit 7 (see (b) of FIG. 3).

Note, however, that, in a case of the configuration illustrated in (b) of FIG. 3, each of (i) a difference in absolute value between Vdd1 and Vdd3 and (ii) a difference in absolute value between Vdd2 and Vdd4 should be smaller than a withstand voltage (VDD0-GND) of the conventional analog amplifier 110 (see (a) of FIG. 3) so that the positive-polarity amplifier circuit 6 and the negative-polarity amplifier circuit 7 can bring about an advantageous effect in terms of size and electric power consumption, as compared with the conventional analog amplifier 110.

FIG. 4 is a view schematically illustrating a circuit configuration of the liquid crystal display panel 2 that is included in the liquid crystal display device 1.

According to the data signal line driving circuit 4, pairs of positive-polarity amplifier circuit 6 and negative-polarity amplifier circuit 7 are provided for the respective data signal lines S1, S2, . . . , and S(2n) (see FIG. 4).

Each pair of positive-polarity amplifier circuit 6 and negative-polarity amplifier circuit 7 is (i) connected, via a corresponding switch section 8, to a corresponding video data line via which video data is supplied from the timing controller 16 and (ii) connected, via a corresponding switch section 9, to a corresponding one of the data signal lines S1, S2, . . . , and S(2n).

A polarity signal POL is supplied, via inverters 19, to pairs of switch sections 8 and 9 for the respective data signal lines S2, . . . , and S(2n) so as to have a polarity reverse to that of a polarity signal POL which is supplied to pairs of switch sections 8 and 9 for the respective data signal lines S1, . . . , and S(2n−1) (see FIG. 4).

Note that, according to Embodiment 1, the data signal line driving circuit 4 receives a single polarity signal POL, and generates, by use of the inverters 19, a polarity signal POL whose polarity is reverse to that of such a single polarity signal POL. Embodiment 1 is, however, not limited to this. An alternative circuit configuration can be employed in which the data signal line driving circuit 4 receives two polarity signals POL having respective reverse polarities.

No problem is caused by such an alternative circuit configuration even if the repair amplifier circuit 5 receives any one of the two polarity signals POL. This is because the repair amplifier circuit 5 includes the polarity setting section 12.

Note also that, according to the liquid crystal display device 1 of Embodiment 1, the data signal line driving circuit 4 includes the pairs of positive-polarity amplifier circuit 6 and negative-polarity amplifier circuit 7 for the respective data signal lines S1, S2, . . . , and S(2n) so as to (i) have a narrowed frame region where no image is displayed and (ii) realize low power consumption. Embodiment 1 is, however, not limited to this. Alternatively, for example, a source amplifier circuit 103a illustrated in FIG. 26 can be employed.

Note also that Embodiment 1 has described an example case where the data signal line driving circuit 4 includes the repair amplifier circuit 5. Embodiment 1 is, however, not limited to the example case.

FIG. 5 is a view illustrating how an electric disconnection is repaired which has happened to the data signal line S(2n−1) of the data signal lines S1, . . . , and S(2n−1) that are connected to a corresponding pair of switch sections 8 and 9 to which a polarity signal POL, which has a polarity identical to that of a polarity signal POL supplied to the repair amplifier circuit 5, is supplied.

Note that, according to Embodiment 1, in a first case where the electric wire 10, which is electrically connected to the logic circuit 11 included in the polarity setting section 12, shows a low level, the polarity setting section 12 is not required to carry out a polarity setting of a polarity signal POL (later described). This is because the polarity signal POL supplied to the logic circuit 11 is supplied, as it is, to the switch sections 8 and 9 of the repair amplifier circuit 5.

The data signal line S(2n−1), having an electric disconnection, is electrically connected to the first auxiliary wire 17 and the second auxiliary wire 18 by being subjected to laser treatment at nodes of (i) the data signal line S(2n−1) and (ii) respective of the first auxiliary wire 17 and the second auxiliary wire 18 (see FIG. 5). This allows the data signal line S(2n−1) which had an electric disconnection to normally receive a data signal.

FIG. 6 is a view illustrating how an electric disconnection is repaired which has happened to the data signal line S(2n) of the data signal lines S2, . . . , and S(2n) that are electrically connected to the respective pairs of switch sections 8 and 9 to which a polarity signal POL, that has a polarity reverse to that of a polarity signal POL supplied to the repair amplifier circuit 5, is supplied.

Note that, according to Embodiment 1, in a second case where the electric wire 10, which is electrically connected to the logic circuit 11 included in the polarity setting section 12, shows a high level, a polarity signal POL which is supplied to the logic circuit 11, is reversed and is then supplied to the switch sections 8 and 9 of the repair amplifier circuit 5. Therefore, in the polarity setting section 12, it is necessary for the electric wire 10 to be electrically disconnected from GND so that the electric wire 10 shows a high level.

Therefore, in the second case, in the polarity setting section 12, the electric wire 10 is electrically disconnected from GND by being subjected to laser treatment so that the logic circuit 11 shows the high level (see FIG. 6), whereas the data signal line S(2n), having an electric disconnection, is electrically connected to the first auxiliary wire 17 and the second auxiliary wire 18 by being subjected to laser treatment at nodes of (i) the data signal line S(2n) and (ii) respective of the first auxiliary wire 17 and the second auxiliary wire 18 (see FIG. 6).

Note that, according to Embodiment 1, connection and disconnection are made by laser treatment. Embodiment 1 is, however, not limited to this.

Note also that, according to Embodiment 1, (i) in the first case where the electric wire 10 shows the low level, upon receipt of a polarity signal POL, the logic circuit 11 supplies the polarity signal POL, as it is, to the switch sections 8 and 9 of the repair amplifier circuit 5, and in contrast (ii) in the second case where the electric wire 10 shows the high level, upon receipt of a polarity signal POL, the logic circuit 11 supplies, to the switch sections 8 and 9 of the repair amplifier circuit 5, a reversed polarity signal POL whose polarity is reverse to that of the polarity signal POL. Embodiment 1 is, however, not limited to this. An alternative circuit configuration can be employed in which (i) in the first case, upon receipt of a polarity signal POL, the logic circuit 11 supplies, to the switch sections 8 and 9 of the repair amplifier circuit 5, a reversed polarity signal POL whose polarity is reverse to that of the polarity signal POL, and in contrast (ii) in the second case, upon receipt of a polarity signal POL, the logic circuit 11 supplies the polarity signal POL, as it is, to the switch sections 8 and 9 of the repair amplifier circuit 5. Note, however, that, according to the alternative circuit configuration, (i) in the first case, the polarity setting section 12 carries out a polarity setting, and in contrast (ii) in the second case, the polarity setting section 12 does not carry out any polarity setting.

Note also that Embodiment 1 has described an example case where one (1) repair amplifier circuit 5, one (1) first auxiliary wire 17, and one (1) second auxiliary wire 18 are provided. It, however, goes without saying that the number of each of the repair amplifier circuit 5, the first auxiliary wire 17, and the second auxiliary wire 18 can be increased as needed.

Embodiment 2

The following description will discuss Embodiment 2 of the present invention with reference to FIGS. 7 through 9. Embodiment 2 is identical to Embodiment 1 except that a liquid crystal display device of Embodiment 2 includes (i) one (1) repair amplifier circuit 20 and one (1) repair amplifier circuit 21 each of which includes no polarity setting section 12, (ii) one (1) first auxiliary wire 17a and one (1) first auxiliary wire 17b and (iii) one (1) second auxiliary wire 18a and one (1) second auxiliary wire 18b.

FIG. 7 is a view schematically illustrating a configuration of a liquid crystal display panel 2a that includes the repair amplifier circuit 20 and the repair amplifier circuit 21 each of which includes no polarity setting section 12.

A polarity signal POL is supplied, via inverters 19, to pairs of switch sections 8 and 9 for the respective data signal lines S2, . . . , and S(2n) so as to have a polarity reverse to that of a polarity signal POL which is supplied to pairs of switch sections 8 and 9 for the respective data signal lines S1, . . . , and S(2n−1).

The repair amplifier circuit 20 receives a polarity signal POL whose polarity is identical to that of a polarity signal POL to be supplied to pairs of switch sections 8 and 9, which pairs are electrically connected to respective data signal lines S1, . . . , and S(2n−1)(see FIG. 7). The repair amplifier circuit 21 receives a polarity signal POL whose polarity is identical to that of a polarity signal POL to be supplied to (i) pairs of switch sections 8 and 9, which pairs are electrically connected to respective data signal lines S2, . . . , and S(2n)(see FIG. 7).

Furthermore, (i) the repair amplifier circuit 20 is electrically connected between the first auxiliary wire 17a and the second auxiliary wire 18a and (ii) the repair amplifier circuit 21 is electrically connected between the first auxiliary wire 17b and the second auxiliary wire 18b.

With the circuit configuration, (i) the repair amplifier circuit 20 can be used for the data signal lines S1, . . . , and S(2n−1) and (ii) the repair amplifier circuit 21 can be used for the data signal lines S2, . . . , and S(2n).

FIG. 8 is a view illustrating how an electric disconnection is repaired which has happened to the data signal line S(2n−1) of the data signal lines S1, . . . , and S(2n−1) that are connected to a corresponding pair of switch sections 8 and 9 to which a polarity signal POL, which has a polarity identical to that of a polarity signal POL to be supplied to the repair amplifier circuit 20, is supplied.

The data signal line S(2n−1), having an electric disconnection, is electrically connected to the first auxiliary wire 17a and the second auxiliary wire 18a by being subjected to laser treatment at nodes of (i) the data signal line S(2n−1) and (ii) respective of the first auxiliary wire 17a and the second auxiliary wire 18a (see FIG. 8). This allows the data signal line S(2n−1) which had an electric disconnection to normally receive a data signal.

FIG. 9 is a view illustrating how an electric disconnection is repaired which has happened to the data signal line S(2n) of the data signal lines S2, . . . , and S(2n) that are connected to a corresponding pair of switch sections 8 and 9 to which a polarity signal POL, which has a polarity identical to that of a polarity signal POL to be supplied to the repair amplifier circuit 21, is supplied.

The data signal line S(2n), having an electric disconnection, is electrically connected to the first auxiliary wire 17b and the second auxiliary wire 18b by being subjected to laser treatment at nodes of (i) the data signal line S(2n) and (ii) respective of the first auxiliary wire 17b and the second auxiliary wire 18b (see FIG. 9). This allows the data signal line S(2n) which had an electric disconnection to normally receive a data signal.

With the circuit configuration, electric disconnection of any of the data signal lines S1, . . . , and S(2S) can be thus repaired by use of the repair amplifier circuit 20 or 21 even in a case where each of the repair amplifier circuits 20 and 21 includes no polarity setting section 12.

Note that Embodiment 2 has described an example case where one (1) repair amplifier circuit 20 and one (1) repair amplifier circuit 21 are provided. Embodiment 2 is, however, not limited to the example case. The number of each of the repair amplifier circuit 20 and the repair amplifier circuit 21 can be appropriately determined as needed.

Note also that, according to Embodiment 2, a polarity signal whose phase is reversed is generated by use of an inverter 19. Embodiment 2, however, is not limited to this. The polarity setting section 12, described in Embodiment 1, can be employed instead of the inverter 19.

Embodiment 3

The following description will discuss Embodiment 3 of the present invention with reference to FIGS. 10 through 12. Embodiment 3 is identical to Embodiments 1 and 2 except that, in a liquid crystal display device of Embodiment 3, two of data signal lines S1, . . . , and S(2n), via which respective reverse data signals are supplied during one (1) horizontal period (1H period), are repaired by use of one (1) repair amplifier circuit 22 which includes one (1) positive-polarity amplifier circuit 6 and one (1) negative-polarity amplifier circuit 7.

FIG. 10 is a view schematically illustrating a configuration of a liquid crystal display panel 2b that includes the repair amplifier circuit 22.

The repair amplifier circuit 22 is electrically connected to one (1) first auxiliary wire 17c, one (1) first auxiliary wire 17d, one (1) second auxiliary wire 18c, and one (1) second auxiliary wire 18d (see FIG. 10).

For example, in a case where (i) dot reversal driving is employed and (ii) electric disconnections are happened to the respective data signal lines S1 and S(2n), via which reverse data signals are supplied during one (1) horizontal period (1H period), the electric disconnections are repaired by use of the repair amplifier circuit 22 as follows: (i) the data signal line S1, having an electric disconnection, is electrically connected to the first auxiliary wire 17c and the second auxiliary wire 18c by being subjected to laser treatment at nodes of the data signal line S1 and respective of the first auxiliary wire 17c and the second auxiliary wire 18c and (ii) the data signal line S(2n), having an electric disconnection, is electrically connected to the first auxiliary wire 17d and the second auxiliary wire 18*d* by being subjected to laser treatment at nodes of the data signal line S(2*n*) and respective of the first auxiliary wire 17*d* and the second auxiliary wire 18*d* (see FIG. 10). This allows the data signal line S1 and the data signal line S(2*n*) which had the electric disconnections to normally receive the respective reverse data signals.

FIG. 11 is a view illustrating a circuit configuration of the repair amplifier circuit 22.

As illustrated in FIG. 11, the first auxiliary wire 17*c* is connected to (i) the positive-polarity amplifier circuit 6 via a switch SW1 and (ii) the negative-polarity amplifier circuit 7 via a switch SW3.

The first auxiliary wire 17*d* is connected to (i) the negative-polarity amplifier circuit 7 via a switch SW2 and (ii) the positive-polarity amplifier circuit 6 via a switch SW4.

The positive-polarity amplifier circuit 6 has an output terminal that is connected to (i) the second auxiliary wire 18*c* via a switch SW5 and (ii) the second auxiliary wire 18*d* via a switch SW7.

The negative-polarity amplifier circuit 7 has an output terminal that is connected to (i) the second auxiliary wire 18*c* via a switch SW8 and (ii) the second auxiliary wire 18*d* via a switch SW6.

A polarity signal POL is supplied to the switches SW1, SW2, SW5, and SW6. In a case where the polarity signal POL is a high-level polarity signal POL, the switches SW1, SW2, SW5, and SW6 become in a connection (Short) state. In contrast, in a case where the polarity signal POL is a low-level polarity signal POL, the switches SW1, SW2, SW5, and SW6 become in a disconnection (Open) state.

A reversed polarity signal POL whose polarity is reverse to that of the polarity signal POL is supplied to the switches SW3, SW4, SW7, and SW8 via an inverter 19. As with the switches SW1, SW2, SW5, and SW6, (i) the switches SW3, SW4, SW7, and SW8 become in a connection (Short) state in a case where the reversed polarity signal POL is a high-level reversed polarity signal POL, whereas (ii) the switches SW3, SW4, SW7, and SW8 become in a disconnection (Open) state in a case where the reversed polarity signal POL is a low-level reversed polarity signal POL.

FIG. 12 is a view illustrating a timing chart obtained during driving of the repair amplifier circuit 22.

As illustrated in FIG. 12, (i) a polarity signal POL is reversed for each horizontal period and (ii) the switches SW1 and SW2 are in a connection (Short) state while the switches SW3 and SW4 are in a disconnection (Open) state.

During a first horizontal period during which a polarity signal POL is a high-level polarity signal POL, (i) an input signal voltage 1, which is a positive data signal that has been inputted via the first auxiliary wire 17*c*, is outputted as an output signal voltage 1 via the switch SW1, the positive-polarity amplifier circuit 6, the switch SW5, and the second auxiliary wire 18*c*. During the first horizontal period, an input signal voltage 2, which is a negative data signal which has been inputted via the first auxiliary wire 17*d*, is outputted as an output signal voltage 2 via the switch SW2, the negative-polarity amplifier circuit 7, the switch SW6, and the second auxiliary wire 18*d*.

During a second horizontal period during which a polarity signal POL is a low-level polarity signal POL, (i) an input signal voltage 1, which is a negative data signal that has been inputted via the first auxiliary wire 17*c*, is outputted as an output signal voltage 1 via the switch SW3, the negative-polarity amplifier circuit 7, the switch SW8, and the second auxiliary wire 18*c*. During the second horizontal period, an input signal voltage 2, which is a positive data signal which has been inputted via the first auxiliary wire 17*d*, is outputted as an output signal voltage 2 via the switch SW4, the positive-polarity amplifier circuit 6, the switch SW7, and the second auxiliary wire 18*d*.

With the circuit configuration, (i) an electric disconnection happened to a data signal line via which a positive data signal is supplied and (ii) an electric disconnection happened to a data signal line via which a negative data signal is supplied can be simultaneously repaired by use of a single repair amplifier circuit 22.

Therefore, such a repair amplifier circuit 22 is suitable for a case where the liquid crystal display panel 2*b* carries out display by use of a driving method, such as a dot reversal driving method or a source reversal driving method, in which any adjacent data signal lines have respective reverse polarities.

Embodiment 4

The following description will discuss Embodiment 4 of the present invention with reference to FIGS. 13 through 18. Embodiment 4 is identical to Embodiments 1 through 3 except that a repair amplifier circuit 5*a*, a first repair amplifier circuit 5*b*, or a second repair amplifier circuit 5*b*, each of which is provided in a corresponding liquid crystal display device of Embodiment 4, includes a third switch circuit 23, a third switch circuit 24 or a third switch circuit 24*a*, respectively. During polarity reversal, each of the third switch circuit 23, the third switch circuit 24, and the third switch circuit 24*a* causes a corresponding second auxiliary wire 18 to (i) be electrically disconnected from a corresponding one of the repair amplifier circuit 5*a*, the first repair amplifier circuit 5*b*, or the second repair amplifier circuit 5*b* and (ii) show a voltage which falls within an output voltage range of a corresponding positive-polarity amplifier circuit 6 and an output voltage range of a corresponding negative-polarity amplifier circuit 7.

FIG. 13 is a view illustrating a circuit configuration of the repair amplifier circuit 5*a* included in a liquid crystal display device of Embodiment 4.

The repair amplifier circuit 5*a* includes the third switch circuit 23 which includes switches SW5, SW6, SW7, and SW8 (see FIG. 13). During a polarity reversal, the switches SW5, SW6, SW7, and SW8 cause (i) a second auxiliary wire 18 to be electrically disconnected from output terminals of a positive-polarity amplifier circuit 6 and a negative-polarity amplifier circuit 7 in the repair amplifier circuit 5*a* and then (ii) the second auxiliary wire 18 to be connected to GND.

The repair amplifier circuit 5*a* includes switches SW1, SW2, SW3, and SW4 (see FIG. 13) which are switched, during polarity reversal, so that a data signal, which is to be supplied to the second auxiliary wire 18 via one of the positive-polarity amplifier circuit 6 and the negative-polarity amplifier circuit 7, is supplied to the second auxiliary wire 18 via the other of the positive-polarity amplifier circuit 6 and the negative-polarity amplifier circuit 7.

A polarity signal POL is supplied, via an inverter 19, to the switches SW2 and SW4. It follows that such a polarity signal POL has a polarity reverse to that of a polarity signal POL to be supplied to the switches SW1 and SW3.

FIG. 14 is a view illustrating a timing chart obtained during driving of the repair amplifier circuit 5*a*.

As illustrated in FIG. 14, a connection (Short) state of the switches SW1 and SW3 and a connection (Short) state of the switches SW2 and SW4 are alternated for each horizontal period. The switches SW5 and SW6 become in a disconnection (Open) state earlier by a predetermined period of time than timing at which a polarity signal POL is reversed, that is, timing at which states of the respective switches SW1, SW2, SW3, and SW4 are changed. The switches SW5 and SW6 then become in a connection (Short) state again later by a predetermined period of time than the timing at which the states of the respective switches SW1, SW2, SW3, and SW4 are changed (see FIG. 14).

While the switches SW5 and SW6 are in a disconnection (Open) state, it is possible for the second auxiliary wire 18 to be electrically disconnected from the output terminals of the positive-polarity amplifier circuit 6 and the negative-polarity amplifier circuit 7. While (i) the switches SW7 and SW8 are in a connection (Short) state for a predetermined period of time and (ii) the switches SW5 and SW6 are in a disconnection (Open) state, the second auxiliary wire 18 is connected to GND for the predetermined period of time.

With the circuit configuration, it is possible to cause a voltage of the second auxiliary wire 18 to be a ground voltage GND, which is a substantially intermediate level in a power supply voltage range of the repair amplifier circuit 5a from Vdd1 to Vdd2, before the second auxiliary wire 18 is electrically connected to the positive-polarity amplifier circuit 6 or the negative-polarity amplifier circuit 7. It is therefore possible to prevent the positive-polarity amplifier circuit 6 and the negative-polarity amplifier circuit 7 from being damaged. Since the second auxiliary wire 18 is connected to GND, no electric charge is superfluously transferred. This causes no increase in electric power for driving a data signal line.

Embodiment 4 employs a circuit configuration in which the second auxiliary wire 18 is connected to GND via the switches SW7 and SW8. Embodiment 4 is, however, not limited to such a circuit configuration. Embodiment 4 can employ an alternative third switch circuit 23 (later described) in which the second auxiliary wire 18 is connected, via the switches SW7 and SW8, to an electric power supply voltage (between Vdd1 and GND) of the positive-polarity amplifier circuit 6 or an electric power supply voltage (between GND and Vdd2) of the negative-polarity amplifier circuit 7. Embodiment 4 can employ another alternative third switch circuit 23 (later described) in which the second auxiliary wire 18 is connected to a node (Node) whose voltage falls within a power supply voltage range of the positive-polarity amplifier circuit 6 or the negative-polarity amplifier circuit 7 to which the second auxiliary wire 18 is to be connected after a polarity is reversed.

In the third switch circuit 24 (see FIG. 15), during polarity reversal, a second auxiliary wire 18 is (i) electrically disconnected from the first repair amplifier circuit 5b and then (ii) electrically connected to an electric power supply P for alternately supplying Vdd1 and Vdd2 to the second auxiliary wire 18 via respective switches SW7 and SW8 for each predetermined period of time (for each horizontal period). Therefore, the switches SW7 and SW8 can be controlled by use of a single control signal.

FIG. 16 is a view illustrating a timing chart obtained during driving of the first repair amplifier circuit 5b illustrated in FIG. 15.

As illustrated in FIG. 16, an output signal voltage to be outputted via the second auxiliary wire 18 is alternated between Vdd1 and Vdd2 for each timing at which the switches SW7 and SW8 become in a connection (Short) state. The output signal voltage becomes equal to an input signal voltage to be inputted via a first auxiliary wire 17, during a time period during which the switches SW7 and SW8 are in a disconnection (Open) state.

FIG. 17 is a view illustrating a circuit configuration of the second repair amplifier circuit 5b that includes the third switch circuit 24a, which second repair amplifier circuit 5b can be included in the liquid crystal display device of Embodiment 4.

As illustrated in FIG. 17, the second repair amplifier circuit 5b includes the third switch circuit 24a. During polarity reversal, the third switch circuit 24a causes (i), a second auxiliary wire 18 to be disconnected from an output terminals of a positive-polarity amplifier circuit 6 and a negative-polarity amplifier circuit 7 in the second repair amplifier circuit 5b and then (ii) the second auxiliary wire 18 to be electrically connected to (i) an electric power supply which has a power supply voltage range (Vdd1 through GND) of the positive-polarity amplifier circuit 6 or (ii) an electric power supply which has a power supply voltage range (GND through Vdd2) of the negative-polarity amplifier circuit 7.

Note that the second repair amplifier circuit 5b includes switches SW1, SW2, SW3, and SW4 (see FIG. 17) which are switched, during polarity reversal, so that a data signal, which is to be supplied to the second auxiliary wire 18 via one of the positive-polarity amplifier circuit 6 and the negative-polarity amplifier circuit 7, is supplied to the second auxiliary wire 18 via the other of the positive-polarity amplifier circuit 6 and the negative-polarity amplifier circuit 7.

A polarity signal POL is supplied, via an inverter 19, to the switches SW2 and SW4. It follows that such a polarity signal POL has a polarity reverse to that of a polarity POL to be supplied to the switches SW1 and SW3.

The following description will discuss an example case where dot reversal driving is employed. According to the dot reversal driving, a polarity signal POL is reversed for each horizontal period. Therefore, for a first horizontal period, an input signal inputted via the first auxiliary wire 17 is outputted via one of the positive-polarity amplifier circuit 6 and the negative-polarity amplifier circuit 7. For a second horizontal period directly after the first horizontal period, an input signal inputted via the first auxiliary wire 17 is outputted via the other of the positive-polarity amplifier circuit 6 and the negative-polarity amplifier circuit 7. That is, an input signal inputted via the first auxiliary wire 17 is outputted in alternate via the positive-polarity amplifier circuit 6 and via the negative-polarity amplifier circuit 7 for each horizontal period.

A switch SW5 and a switch SW6, which are included in the third switch circuit 24a, are switched between a connection (Short) state and a disconnection (Open) state in response to a single control signal (a control signal for controlling the switches SW5 and SW6) which has been supplied from a timing controller 16.

That is, the switches SW5 and SW6 are provided for causing the second auxiliary wire 18 to be electrically disconnected or connected from or to the output terminals of the positive-polarity amplifier circuit 6 and the negative-polarity amplifier circuit 7.

Note that, according to the circuit configuration illustrated in FIG. 17, the second auxiliary wire 18 is connected to a voltage after being electrically disconnected from the output terminals of the positive-polarity amplifier circuit 6 and the negative-polarity amplifier circuit 7. Used as such a voltage is (i) a power supply voltage Vdd1 which falls within the power supply voltage range of the positive-polarity amplifier circuit 6 or (ii) a power supply voltage Vdd2 which falls within the power supply voltage range of the negative-polarity amplifier circuit 7. Note, however, that Embodiment 4 is not limited to such, provided that the voltage level falls within the power supply voltage range of the positive-polarity amplifier circuit 6 or the power supply voltage range of the negative-polarity amplifier circuit 7.

The third switch circuit 24a further includes (i) a switch SW7 for causing the second auxiliary wire 18 to be connected to the power supply voltage Vdd2 and (ii) a switch SW8 for causing the second auxiliary wire 18 to be connected to the power supply voltage Vdd1.

A switch SW7 control signal for controlling the switch SW7 and a switch SW8 control signal for controlling the switch SW8 are supplied from the timing controller 16 to the switch SW7 and the switch SW8, respectively.

FIG. 18 is a view illustrating a timing chart obtained during driving of the second repair amplifier circuit 5b which includes the third switch circuit 24a illustrated in FIG. 17.

As illustrated in FIG. 18, a connection (Short) state of the switches SW1 and SW3 and a connection (Short) state of the switches SW2 and SW4 are alternated for each horizontal period. The switches SW5 and SW6 become in a disconnection (Open) state earlier by a predetermined period of time than timing at which a polarity signal POL is reversed, that is, timing at which states of the respective switches SW1, SW2, SW3, and SW4 are changed. The switches SW5 and SW6 then become in a connection (Short) state again later by a predetermined period of time than the timing at which the states of the respective switches SW1, SW2, SW3, and SW4 are changed (see FIG. 18).

While the switches SW5 and SW6 are in a disconnection (Open) state, it is possible for the second auxiliary wire 18 to be electrically disconnected from the output terminals of the positive-polarity amplifier circuit 6 and the negative-polarity amplifier circuit 7. While the switches SW5 and SW6 are in a disconnection (Open) state, the switch SW7 and the switch SW8 are alternately in a connection (Short) state for a predetermined period of time.

Timing, at which the switch SW7 or SW8 becomes in a connection (Short) state, is set so as to be earlier by a predetermined period of time than timing at which the switches SW5 and SW6 become in a connection (Short) state.

This (i) allows, before the second auxiliary wire 18 is electrically connected to the negative-polarity amplifier circuit 7, a voltage level at a point A (see FIG. 17) to become the power supply voltage Vdd2 which falls within the power supply voltage range of the negative-polarity amplifier circuit 7 and (ii) allows, before the second auxiliary wire 18 is electrically connected to the positive-polarity amplifier circuit 6, the voltage level at the point A to become the power supply voltage Vdd1 which falls within the power supply voltage range of the positive-polarity amplifier circuit 6.

Note that the voltage level at the point A is indicated by a dotted line (see FIG. 18) while the switches SW5, SW6, SW7, and SW8 are in a disconnection (Open) state. This is because the voltage level at the point A can be in a high impedance state or can be the power supply voltage Vdd1 or Vdd2 while the switches SW5, SW6, SW7, and SW8 are in a disconnection (Open) state and therefore will have an uncertain waveform.

With the circuit configuration, in a case where a polarity of an input signal to be inputted via the first auxiliary wire 17 is reversed from positive one to negative one in response to a polarity signal POL, the third switch circuit 24a causes (i) the second auxiliary wire 18 to be electrically disconnected from the positive-polarity amplifier circuit 6 and the negative-polarity amplifier circuit 7 and then (ii) the second auxiliary wire 18 to be connected, for a predetermined period of time, to the power supply voltage Vdd2 which falls within the power supply voltage range of the negative-polarity amplifier circuit 7. In contrast, in a case where a polarity of an input signal to be inputted via the first auxiliary wire 17 is reversed from negative one to positive one in response to a polarity signal POL, the third switch circuit 24a causes (i) the second auxiliary wire 18 to be electrically disconnected from the positive-polarity amplifier circuit 6 and the negative-polarity amplifier circuit 7 and then (ii) the second auxiliary wire 18 to be connected, for a predetermined period of time, to the power supply voltage Vdd1 which falls within the power supply voltage range of the positive-polarity amplifier circuit 6.

With the circuit configuration, the third switch circuit 24a causes (i) the second auxiliary wire 18 to be electrically disconnected from the positive-polarity amplifier circuit 6 and the negative-polarity amplifier circuit 7, (ii) the voltage level of the second auxiliary wire 18 to approach a voltage which falls within the power supply voltage range of one of the positive-polarity amplifier circuit 6 and the negative-polarity amplifier circuit 7, which one corresponds to a polarity obtained by polarity reversal, and then (iii) the second auxiliary wire 18 to be electrically connected again to the one of the positive-polarity amplifier circuit 6 and the negative-polarity amplifier circuit 7. It is therefore possible to prevent the second repair amplifier circuit 5b from being damaged. In a case where no polarity reversal is carried out at a transition from one horizontal period to the next or from one vertical period to the next, the third switch circuit 24a will never operate. This ultimately allows electric power consumption to be prevented from being increased due to superfluous transfer of electric charges.

Embodiment 5

The following description will discuss Embodiment 5 of the present invention with reference to FIGS. 19 through 24. Embodiment 5 is identical to Embodiments 1 through 4 except that a repair amplifier circuit 5c, a first repair amplifier circuit 5d, or a second repair amplifier circuit 5d, each of which is provided in a corresponding liquid crystal display devices of Embodiment 5, include a fourth switch circuit 25, a fourth switch circuit 26 or a fourth switch circuit 26a, respectively. Each of the fourth switch circuit 25, the fourth switch circuit 26, and the fourth switch circuit 26a causes a corresponding first auxiliary wire 17 to be electrically disconnected from a corresponding one of the repair amplifier circuit 5c and the first and second repair amplifier circuits 5d and (ii) show a voltage which falls within an output voltage range of a corresponding positive-polarity amplifier circuit 6 and an output voltage range of a corresponding negative-polarity amplifier circuit 7.

FIG. 19 is a view illustrating a circuit configuration of the repair amplifier circuit 5c included in the liquid crystal display device of Embodiment 5.

The repair amplifier circuit 5c includes the fourth switch circuit 25 which includes switches SW5, SW6, SW7, and SW8 (see FIG. 19). In a case of polarity reversal, the switches SW5, SW6, SW7, and SW8 cause (i) a first auxiliary wire 17 to be electrically disconnected from a positive-polarity amplifier circuit 6 and a negative-polarity amplifier circuit 7 that are included in the repair amplifier circuit 5c and then (ii) the first auxiliary wire 17 to be electrically connected to GND for a predetermined period of time.

FIG. 20 is a view illustrating a timing chart obtained during driving of the repair amplifier circuit 5c.

As illustrated in FIG. 20, a connection (Short) state of switches SW1 and SW3 and a connection (Short) state of switches SW2 and SW4 are alternated for each horizontal period. The switches SW5 and SW6 become in a disconnection (Open) state earlier by a predetermined period of time than timing at which a polarity signal POL is reversed, that is, timing at which states of the respective switches SW1, SW2, SW3, and SW4 are changed. The switches SW5 and SW6 then become in a connection (Short) state again later by a predetermined period of time than the timing at which the states of the respective switches SW1, SW2, SW3, and SW4 are changed (see FIG. 20).

The switches SW7 and SW8 are in a connection (Short) state during a time period during which the switches SW5 and SW 6 are in a disconnection (Open) state.

As illustrated in FIG. 20, an input signal voltage to be inputted via the first auxiliary wire 17 becomes a GND level at timing at which the switches SW7 and SW8 become in a connection (Short) state.

An output signal voltage to be outputted via a second auxiliary wire 18 is indicated by a dotted line (see FIG. 20) while the switches SW5 and SW6 are in a disconnection (Open) state. This is because the output signal voltage can be in a high impedance state or can be a power supply voltage while the switches SW5 and SW6 are in a disconnection (Open) state and therefore will have an uncertain waveform.

Note that an input signal voltage to be inputted via the first auxiliary wire 17 is indicated by a dotted line (see FIG. 20) while the switches SW5, SW6, SW7, and SW8 are in a disconnection (Open) state. This is because the input signal voltage can be in a high impedance state or can be the power supply voltage while the switches SW5, SW6, SW7, and SW8 are in a disconnection (Open) state and therefore will have uncertain waveform.

With the circuit configuration, it is possible to cause a voltage of the first auxiliary wire 17 to be a ground voltage GND, which is a substantially intermediate level in a power supply voltage range of the repair amplifier circuit 5c from Vdd1 to Vdd2, before the first auxiliary wire 17 is electrically connected to the positive-polarity amplifier circuit 6 or the negative-polarity amplifier circuit 7. It is therefore possible to prevent the positive-polarity amplifier circuit 6 and the negative-polarity amplifier circuit 7 from being damaged. Since the first auxiliary wire 17 is connected to GND, no electric charge is superfluously transferred. This causes no increase in electric power for driving a data signal line.

Embodiment 5 employs a circuit configuration in which the first auxiliary wire 17 is connected to GND via the switches SW7 and SW8. Embodiment 5 is, however, not limited to such a circuit configuration. Embodiment 5 can employ an alternative fourth switch circuit 26 (later described) in which the first auxiliary wire 17 is connected, via the switches SW7 and SW8, to an electric power supply voltage (between Vdd1 through GND) of the positive-polarity amplifier circuit 6 or an electric power supply voltage (GND through Vdd2) of the negative-polarity amplifier circuit 7. Embodiment 5 can employ another fourth switch circuit 26 (later described) in which the first auxiliary wire 17 is connected to a node (Node) whose voltage falls within a power supply voltage range of the positive-polarity amplifier circuit 6 or the negative-polarity amplifier circuit 7 to which the first auxiliary wire 17 is to be connected after a polarity is reversed.

In the fourth switch circuit 26 (see FIG. 21), the first auxiliary wire 17 is electrically connected to an electric power supply P for alternately supplying Vdd1 and Vdd2 to the first auxiliary wire 17 via respective switches SW7 and SW8 for each predetermined period of time (for each horizontal period). Therefore, the switches SW7 and SW8 can be controlled by use of a single control signal.

FIG. 22 is a view illustrating a timing chart obtained during driving of the first repair amplifier circuit 5d illustrated in FIG. 21.

As illustrated in FIG. 22, an input signal voltage to be inputted to the first auxiliary wire 17 (a voltage level of a signal to be supplied to the first auxiliary line 17) (i) is alternated between Vdd1 and Vdd2 for each timing at which the switches SW7 and SW8 become in a connection (Short) state and (ii) becomes equal to an input signal voltage to be inputted to the first auxiliary wire 17 in synchronization with timing at which the switches SW5 and SW6 become in a connection (Short) state while the switches SW7 and SW8 are in a disconnection (Open) state (see FIG. 22).

An output signal voltage to be outputted via a second auxiliary wire 18 is indicated by a dotted line (see FIG. 22) while the switches SW5 and SW6 become in a disconnection (Open) state. This is because the output signal voltage can be in a high impedance state or can be a power supply voltage while the switches SW5 and SW6 are in a disconnection (Open) state and therefore will have an uncertain waveform.

Note that an input signal voltage to be inputted via the first auxiliary wire 17 is indicated by a dotted line (see FIG. 22) while the switches SW5, SW6, SW7, and SW8 are in a disconnection (Open) state. This is because the input signal voltage can be in a high impedance state or can be the power supply voltage while the switches SW5, SW6, SW7, and SW8 are in a disconnection (Open) state and therefore will have uncertain waveform.

FIG. 23 is a view illustrating a circuit configuration of the second repair amplifier circuit 5d that includes the fourth switch circuit 26a, which second repair amplifier circuit 5d can be included in the liquid crystal display device of Embodiment 5.

As illustrated in FIG. 23, the second repair amplifier circuit 5d includes the fourth switch circuit 26a. During polarity reversal, the fourth switch circuit 26a causes (i) a first auxiliary wire 17 to be electrically disconnected from a positive-polarity amplifier circuit 6 and a negative-polarity amplifier circuit 7 in the second repair amplifier circuit 5d and then (ii) the first auxiliary wire 17 to be electrically connected to (i) an electric power supply which has a power supply voltage range (Vdd1 through GND) of the positive-polarity amplifier circuit 6 or (ii) an electric power supply which has a power supply voltage range (GND through Vdd2) of the negative-polarity amplifier circuit 7.

Note that the second repair amplifier circuit 5d includes switches SW1, SW2, SW3, and SW4 (see FIG. 23) which are switched, during polarity reversal, so that a data signal, which is to be supplied to a second auxiliary wire 18 via one of the positive-polarity amplifier circuit 6 and the negative-polarity amplifier circuit 7, is supplied to the second auxiliary wire 18 via the other of the positive-polarity amplifier circuit 6 and the negative-polarity amplifier circuit 7.

A polarity signal POL is supplied, via an inverter 19, to the switches SW2 and SW4. It follows that such a polarity signal POL has a polarity reverse to that of a polarity signal POL to be supplied to the switches SW1 and SW3.

The following description will discuss an example case where dot reversal driving is employed. According to the dot reversal driving, a polarity signal POL is reversed for each horizontal period. Therefore, for a first horizontal period, an input signal inputted via the first auxiliary wire 17 is outputted via one of the positive-polarity amplifier circuit 6 and the negative-polarity amplifier circuit 7. For a second horizontal period directly after the first horizontal period, an input signal inputted via the first auxiliary wire 17 is outputted via the other of the positive-polarity amplifier circuit 6 and the negative-polarity amplifier circuit 7. That is, an input signal inputted via the first auxiliary wire 17 is outputted in alternate between via the positive-polarity amplifier circuit 6 and via the negative-polarity amplifier circuit 7 for each horizontal period.

A switch SW5 and a switch SW6, which are included in the fourth switch circuit 26a, are switched between a connection (Short) state and a disconnection (Open) state in response to a single control signal (a control signal for controlling the switches SW5 and SW6) which has been supplied from a timing controller 16.

That is, the switches SW5 and SW6 are provided for causing the first auxiliary wire 17 to be electrically disconnected or connected from or to the positive-polarity amplifier circuit 6 and the negative-polarity amplifier circuit 7.

Note that, according to the circuit configuration illustrated in FIG. 23, the first auxiliary wire 17 is connected to a voltage after being electrically disconnected from the positive-polarity amplifier circuit 6 and the negative-polarity amplifier circuit 7. Used as such a voltage is (i) a power supply voltage Vdd1 which falls within the power supply voltage range of the positive-polarity amplifier circuit 6 or (ii) a power supply voltage Vdd2 which falls within the power supply voltage range of the negative-polarity amplifier circuit 7. Note, however, that embodiment 5 is limited to such, provided that the voltage level falls within the power supply voltage range of the positive-polarity amplifier circuit 6 or the power supply voltage range of the negative-polarity amplifier circuit 7.

The fourth switch circuit 26a further includes (i) a switch SW7 for causing the first auxiliary wire 17 to be connected to the power supply voltage Vdd2 and (ii) a switch SW8 for causing the first auxiliary wire 17 to be connected to the power supply voltage Vdd1.

A switch SW7 control signal for controlling the switch SW7 and a switch SW8 control signal for controlling the switch SW8 are supplied from the timing controller 16 to the switch SW7 and the switch SW8, respectively.

FIG. 24 is a view illustrating a timing chart obtained during driving of the second repair amplifier circuit 5d which includes the fourth switch circuit 26a illustrated in FIG. 23.

As illustrated in FIG. 24, a connection (Short) state of the switches SW1 and SW3 and a connection (Short) state of the switches SW2 and SW4 are alternated for each horizontal period. The switches SW5 and SW6 become in a disconnection (Open) state earlier by a predetermined period of time than timing at which a polarity signal POL is reversed, that is, timing at which states of the respective switches SW1, SW2, SW3, and SW4 are changed. The switches SW5 and SW6 then become in a connection (Short) state again later by a predetermined period of time than the timing at which the states of the respective switches SW1, SW2, SW3, and SW4 are changed (see FIG. 24).

While the switches SW5 and SW6 are in a disconnection (Open) state, it is possible for the first auxiliary wire 17 to be electrically disconnected from the positive-polarity amplifier circuit 6 and the negative-polarity amplifier circuit 7. While the switches SW5 and SW6 are in a disconnection (Open) state, the switch SW7 and the switch SW8 are alternately in a connection (Short) state for a predetermined period of time.

Timing, at which the switch SW7 or SW8 becomes in a connection (Short) state, is set so as to be earlier by a predetermined period of time than timing at which the switches SW5 and SW6 become in a connection (Short) state.

This allows, before the first auxiliary wire 17 is electrically connected to the negative-polarity amplifier circuit 7, a voltage level at a point A (see FIG. 23) to become the power supply voltage Vdd2 which falls within the power supply voltage range of the negative-polarity amplifier circuit 7 and (ii) allows, before the first auxiliary wire 17 is electrically connected to the positive-polarity amplifier circuit 6, the voltage level at the point A to become the power supply voltage Vdd1 which falls within the power supply voltage range of the positive-polarity amplifier circuit 6.

Note that the voltage level at the point A is indicated by a dotted line (see FIG. 24) while the switches SW5, SW6, SW7, and SW8 are in a disconnection (Open) state. This is because the voltage level at the point A can be in a high impedance state or can be the power supply voltage Vdd1 or Vdd2 while the switches SW5, SW6, SW7, and SW8 are in a disconnection (Open) state and therefore will have an uncertain waveform.

An output signal voltage, at a point B illustrated in FIG. 23, to be outputted from the second auxiliary wire 18 can become corresponding to a high impedance state or equal to a power supply voltage at timing at which the switches SW5 and SW6 become in a disconnection (Open) state. This causes the output signal voltage to have an unfixed waveform. In terms of this, the output signal voltage is indicated by a dotted line (see FIG. 24).

With the configuration, in a case where a polarity of an input signal to be inputted via the first auxiliary wire 17 is reversed from positive one to negative one in response to a polarity signal POL, the fourth switch circuit 26a causes (i) the first auxiliary wire 17 to be electrically disconnected from the positive-polarity amplifier circuit 6 and the negative-polarity amplifier circuit 7 and then (ii) the first auxiliary wire 17 to be connected, for a predetermined period of time, to the power supply voltage Vdd2 which falls within the power supply voltage range of the negative-polarity amplifier circuit 7. In contrast, in a case where a polarity of an input signal to be inputted via the first auxiliary wire 17 is reversed from negative one to positive one in response to a polarity signal POL, the fourth switch circuit 26a causes (i) the first auxiliary wire 17 to be electrically disconnected from the positive-polarity amplifier circuit 6 and the negative-polarity amplifier circuit 7 and then (ii) the first auxiliary wire 17 to be connected, for a predetermined period of time, to the power supply voltage Vdd1 which falls within the power supply voltage range of the positive-polarity amplifier circuit 6.

With the circuit configuration, the fourth switch circuit 26a causes (i) the first auxiliary wire 17 to be electrically disconnected from the positive-polarity amplifier circuit 6 and the negative-polarity amplifier circuit 7, (ii) the voltage level of the first auxiliary wire 17 to approach a voltage which falls within the power supply voltage range of one of the positive-polarity amplifier circuit 6 and the negative-polarity amplifier circuit 7, which one corresponds to a polarity obtained by polarity reversal, and then (iii) the first auxiliary wire 17 to be electrically connected again to the one of the positive-polarity amplifier circuit 6 and the negative-polarity amplifier circuit 7. It is therefore possible to prevent the second repair amplifier circuit 5d from being damaged. In a case where no polarity reversal is carried out at a transition from one horizontal period to the next or from one vertical period to the next, the fourth switch circuit 26a will never operate. This ultimately allows electric power consumption to be prevented from being increased due to superfluous transfer of electric charges.

It is preferable to configure the display device of the present invention such that each of the positive-polarity amplifier circuit and the negative-polarity amplifier circuit is connected (i) to the first auxiliary wire via a first switch circuit and (ii) to the second auxiliary wire via a second switch circuit.

It is preferable to configure the display device of the present invention such that the first switch circuit and the second switch circuit are switched in response to a polarity signal for reversing a polarity of a data signal to be supplied to the plurality of data signal lines.

The display device includes the first auxiliary wire, the second auxiliary wire, the positive-polarity amplifier circuit, and the negative-polarity amplifier circuit, which are used to repair a defect, such as electric disconnection of a data signal line, in a case where the defect occurs so that the display device is driven.

The first switch circuit and the second switch circuit are switched in response to the polarity signal for reversing the polarity of the data signal to be supplied to the plurality of data signal lines so that the positive-polarity amplifier circuit or the negative-polarity amplifier circuit outputs the data signal.

It is therefore possible to lower each voltage-resistance of a positive-polarity amplifier and a negative-polarity amplifier, as compared with that of a conventional amplifier.

As such, according to the configuration, low power consumption can be attained.

It is preferable to configure the display device of the present invention to further include a polarity setting section for reversing a phase of the polarity signal.

According to the configuration, by causing the polarity setting section to carry out a polarity setting, it is possible to employ any one of the repair amplifier circuits to repair electric connection of any of the data signal lines.

Therefore, the present invention, which includes the polarity setting section, is suitably applicable to a case where the display device carries out display by use of a driving method, such as a dot reversal driving method or a source reversal driving method, in which any adjacent data signal lines have respective reverse polarities.

It is preferable to configure the display device of the present invention to further include: a first repair circuit which is controlled in response to the polarity signal; and a second repair circuit which is controlled in response to a polarity signal whose phase is reversed, each of the first and second repair circuits including the positive-polarity amplifier circuit and the negative-polarity amplifier circuit.

According to the configuration, the display device includes the repair circuit which includes (i) a repair circuit for outputting a signal via the positive-polarity amplifier circuit in response to an identical polarity signal, e.g., a high-level (low-level) polarity signal and (ii) a repair circuit for outputting a signal via the negative-polarity amplifier circuit in response to the identical polarity signal. Therefore, the present invention is suitably applicable to a case where the display device carries out display by use of a driving method, such as a dot reversal driving method or a source reversal driving method, in which any adjacent data signal lines have respective reverse polarities.

It is preferable to configure the display device of the present invention such that the positive-polarity amplifier circuit and the negative-polarity amplifier circuit are included in a third repair circuit, the third repair circuit includes a third switch circuit for (i) electrically disconnecting the second auxiliary wire from the positive-polarity amplifier circuit and the negative-polarity amplifier circuit and then (ii) electrically connecting, for a predetermined period of time, the second auxiliary wire to a node whose voltage falls within a power supply voltage range of the positive-polarity amplifier circuit or the negative-polarity amplifier circuit, and the third switch circuit is switched, only when a polarity of a data signal outputted from the data signal line driving circuit is reversed.

According to the configuration, the third switch circuit causes (i) the second auxiliary wire to be electrically disconnected from the positive-polarity amplifier circuit and the negative-polarity amplifier circuit, (ii) a voltage level of the second auxiliary wire to approach a voltage which falls within the power supply voltage range of one of the positive-polarity amplifier circuit and the negative-polarity amplifier circuit, which one corresponds to a polarity obtained by polarity reversal, and then (iii) the second auxiliary wire to be electrically connected again to the one of the positive-polarity amplifier circuit and the negative-polarity amplifier circuit. It is therefore possible to prevent the third repair circuit from being damaged. In a case where no polarity reversal is carried out at a transition from one horizontal period to the next or from one vertical period to the next, the third switch circuit will never operate. This ultimately allows electric power consumption to be prevented from being increased due to superfluous transfer of electric charges.

It is preferable to configure the display device of the present invention such that the third switch circuit (i) electrically disconnects the second auxiliary wire from the positive-polarity amplifier circuit and the negative-polarity amplifier circuit and then (ii) grounds the second auxiliary wire for a predetermined period of time.

According to the configuration, the third switch circuit (i) electrically disconnects the second auxiliary wire from the positive-polarity amplifier circuit and the negative-polarity amplifier circuit and then (ii) grounds the second auxiliary wire. This causes no superfluous transfer of electric charges, and therefore causes no increase in electric power for driving the data signal lines. This ultimately allows low power consumption to be attained.

It is preferable to configure the display device of the present invention such that the third switch circuit is switched, only when no scan signal line is selected in a display region of the display device.

According to the configuration, display is not affected by such switching of the third switch circuit.

It is preferable to configure the display device of the present invention such that the positive-polarity amplifier circuit and the negative-polarity amplifier circuit are included in a fourth repair circuit, the fourth repair circuit includes a fourth switch circuit for (i) electrically disconnecting the first auxiliary wire from the positive-polarity amplifier circuit and the negative-polarity amplifier circuit and then (ii) electrically connecting, for a predetermined period of time, the first auxiliary wire to a node whose voltage falls within a power supply voltage range of the positive-polarity amplifier circuit or the negative-polarity amplifier circuit, and the fourth switch circuit is switched, only when a polarity of a data signal outputted from the data signal line driving circuit is reversed.

According to the configuration, the fourth switch circuit (i) electrically disconnects the first auxiliary wire from the positive-polarity amplifier circuit and the negative-polarity amplifier circuit, (ii) then causes a voltage level of the first auxiliary wire to approach a voltage which falls within the power supply voltage range of one of the positive-polarity amplifier circuit and the negative-polarity amplifier circuit, which one corresponds to a polarity obtained by polarity reversal, and then (iii) electrically connects again the first auxiliary wire 17 to the one of the positive-polarity amplifier circuit and the negative-polarity amplifier circuit. It is therefore possible to prevent the fourth repair circuit from being damaged. In a case where no polarity reversal is carried out at a transition from one horizontal period to the next or from one vertical period to the next, the fourth switch circuit will never operate. This ultimately allows electric power consumption to be prevented from being increased due to superfluous transfer of electric charges.

It is preferable to configure the display device of the present invention such that the fourth switch circuit (i) electrically disconnects the first auxiliary wire from the positive-polarity amplifier circuit and the negative-polarity amplifier circuit and then (ii) grounds the first auxiliary wire for a predetermined period of time.

According to the configuration, the fourth switch circuit (i) electrically disconnects the first auxiliary wire from the positive-polarity amplifier circuit and the negative-polarity amplifier circuit and then (ii) grounds the first auxiliary wire. This causes no superfluous transfer of electric charges, and therefore causes no increase in electric power for driving the data signal lines. This ultimately allows low power consumption to be attained.

It is preferable to configure the display device of the present invention such that the fourth switch circuit is switched, only when no scan signal line is selected in a display region of the display device.

According to the configuration, display is not affected by such switching of the fourth switch circuit.

It is preferable to configure the display device of the present invention such that the data signal line driving circuit includes (i) the positive-polarity amplifier circuit which is plurally provided and (ii) the negative-polarity amplifier circuit which is plurally provided.

According to the configuration, the positive-polarity amplifier circuit and the negative-polarity amplifier circuit are provided for each of the data signal lines in the data signal line driving circuit. It is therefore possible to attain low power consumption.

It is preferable to configure the display device of the present invention such that the positive-polarity amplifier circuit and the negative-polarity amplifier circuit are included in a fifth repair circuit, the fifth repair circuit is provided with (i) two first auxiliary wires each of which is the first auxiliary wire and (ii) two second auxiliary wires each of which is the second auxiliary wire, and in the fifth repair circuit, in response to a polarity signal for reversing a polarity of a data signal to be supplied to the plurality of data signal lines, (i) the data signal, which has been supplied from one of the two first auxiliary wires, is supplied to one of the two second auxiliary wires via the positive-polarity amplifier circuit or the negative-polarity amplifier circuit or (ii) the data signal, which has been supplied from the other of the two first auxiliary wires, is supplied to the other of the two second auxiliary wires via the positive-polarity amplifier circuit or the negative-polarity amplifier circuit.

According to the configuration, it is possible to simultaneously repair electric disconnections of two of the data signal lines by use of the fifth repair circuit.

This allows the display device to reduce the number of the repair circuits to be included therein. It is therefore possible to realize a cheap display device.

It is preferable to configure the display device of the present invention such that a Low electric power supply of the positive-polarity amplifier circuit and a High electric power supply of the negative-polarity amplifier circuit are used in common.

According to the configuration, it is possible to reduce the number of electric power supplies for generating electric power for the positive-polarity amplifier circuit and the negative-polarity amplifier circuit. This allows low power consumption to be attained with a simple circuit configuration.

It is preferable to configure the display device of the present invention such that each voltage level of the High and Low electric power supplies thus used in common is a ground level.

According to the configuration, it is possible to further reduce the number of electric power supplies for generating electric power for the positive-polarity amplifier circuit and the negative-polarity amplifier circuit. This allows low power consumption to be attained with a simple circuit configuration.

It is preferable to configure the display device of the present invention such that a difference in absolute value between a High power supply voltage of the positive-polarity amplifier circuit and a Low power supply voltage of the negative-polarity amplifier circuit is not more than 0.5 V.

According to the configuration, a positive power supply voltage to be supplied to the positive-polarity amplifier circuit is substantially equal in absolute value to a negative power supply voltage to be supplied to the negative-polarity amplifier circuit. This simplifies a circuit configuration of a booster circuit.

It is preferable to configure the display device of the present invention such that one of the plurality of data signal lines is electrically connected to the first auxiliary wire and the second auxiliary wire.

According to the configuration, it is possible to normally supply a data signal to a data signal line of the plurality of data signal lines which has caused a defect such as electric disconnection, by electrically connecting the data signal line to the first auxiliary wire and the second auxiliary wire.

The display device of the present invention can be configured such that the display device is a liquid crystal display device including a liquid crystal display panel as a display panel.

A liquid crystal display device generally employs reverse polarity driving so as to prevent, for example, polarization of liquid crystal molecules in a liquid crystal layer. Therefore, according to the configuration, electric disconnection of a data signal line can be repaired in the liquid crystal display device. This makes it possible to produce display panels with a high yield rate.

It is preferable to configure the display device of the present invention such that before being electrically connected to the positive-polarity amplifier circuit, the second auxiliary wire is electrically connected, for a predetermined period of time, to a node whose voltage falls within a power supply voltage range that is higher than a ground level, and before being electrically connected to the negative-polarity amplifier circuit, the second auxiliary wire is electrically connected, for a predetermined period of time, to a node whose voltage falls within a power supply voltage range that is lower than the ground level.

According to the configuration, it is possible to (i) electrically disconnect the second auxiliary wire from the positive-polarity amplifier circuit and the negative-polarity amplifier circuit, (ii) then cause a voltage level of the second auxiliary wire to approach a voltage which falls within the power supply voltage range of one of the positive-polarity amplifier circuit and the negative-polarity amplifier circuit, which one corresponds to a polarity obtained by polarity reversal, and then (iii) electrically connects again the second auxiliary wire to the one of the positive-polarity amplifier circuit and the negative-polarity amplifier circuit. It is therefore possible to prevent the repair circuit from being damaged.

It is preferable to configure the display device of the present invention such that before being electrically connected to the positive-polarity amplifier circuit, the first auxiliary wire is electrically connected, for a predetermined period of time, to a node whose voltage falls within a power supply voltage range that is higher than a ground level, and before being electrically connected to the negative-polarity amplifier circuit, the first auxiliary wire is electrically connected, for a predetermined period of time, to a node whose voltage falls within a power supply voltage range that is lower than the ground level.

According to the configuration, it is possible to (i) electrically disconnect the first auxiliary wire from the positive-polarity amplifier circuit and the negative-polarity amplifier circuit, (ii) then cause a voltage level of the first auxiliary wire to approach a voltage which falls within the power supply voltage range of one of the positive-polarity amplifier circuit and the negative-polarity amplifier circuit, which one corresponds to a polarity obtained by polarity reversal, and then (iii) electrically connects again the first auxiliary wire to the one of the positive-polarity amplifier circuit and the negative-polarity amplifier circuit. It is therefore possible to prevent the repair circuit from being damaged.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

The present invention is suitably applicable to a display device such as a liquid crystal display device.

REFERENCE SIGNS LIST

1: liquid crystal display device (display device)
2, 2a, and 2b: liquid crystal display panel
3: scan signal line driving circuit
4: data signal line driving circuit
5a, 5b, 5c, and 5d: repair amplifier circuit (repair circuit)
6: positive-polarity amplifier circuit
7: negative-polarity amplifier circuit
8: switch section (first switch circuit)
9: switch section (second switch circuit)
10: electric wire
11: logic circuit
12: polarity setting section
13: FPC
14: control substrate
15: electric power generating circuit
16: timing controller
17, 17a, 17b, 17c, and 17d: first auxiliary wire
18, 18a, 18b, 18c, and 18d: second auxiliary wire
19: inverter
20: repair amplifier circuit (repair circuit)
21: repair amplifier circuit (repair circuit)
22: repair amplifier circuit (repair circuit)
23: third switch circuit
24 and 24a: third switch circuit
25: fourth switch circuit
26 and 26a: fourth switch circuit
SW: switch
R1: display region
Sn: data signal line
POL: polarity signal

The invention claimed is:

1. A display device, comprising:
a data signal line driving circuit;
a plurality of data signal lines connected to the data signal line driving circuit;
first and second auxiliary wires, each of which can be connected to each of the plurality of data signal lines, the first auxiliary wire being provided so as to intersect the plurality of data signal lines on a side where end parts of the respective plurality of data signal lines are connected to the data signal line driving circuit, and the second auxiliary wire being provided so as to intersect the plurality of data signal lines on a side of the other end parts of the respective plurality of data signal lines;
a positive-polarity amplifier circuit configured to receive a positive data signal from the data signal line driving circuit via the first auxiliary wire; and
a negative-polarity amplifier circuit configured to receive a negative data signal from the data signal line driving circuit via the first auxiliary wire, wherein
an output signal is supplied to the second auxiliary wire from the positive-polarity amplifier circuit or the negative-polarity amplifier circuit;
the positive-polarity amplifier circuit and the negative-polarity amplifier circuit are included in a repair circuit;
the repair circuit includes a first switch circuit configured to (i) electrically disconnect the second auxiliary wire from the positive-polarity amplifier circuit and the negative-polarity amplifier circuit and then (ii) electrically connect, for a predetermined period of time, the second auxiliary wire to a node whose voltage falls within a power supply voltage range of the positive-polarity amplifier circuit or the negative-polarity amplifier circuit; and
the first switch circuit is switched, only when a polarity of a data signal outputted from the data signal line driving circuit is reversed.

2. The display device as set forth in claim 1, wherein:
each of the positive-polarity amplifier circuit and the negative-polarity amplifier circuit is connected (i) to the first auxiliary wire via a second switch circuit and (ii) to the second auxiliary wire via a third switch circuit.

3. The display device as set forth in claim 2, wherein:
the second switch circuit and the third switch circuit are switched in response to a polarity signal for reversing a polarity of a data signal to be supplied to the plurality of data signal lines.

4. A display device as set forth in claim 3, further comprising a polarity setting section configured to reverse a phase of the polarity signal.

5. A display device as set forth in claim 3, wherein
the repair circuit is controlled in response to the polarity signal; and
the display device further comprises an additional repair circuit which is controlled in response to a polarity signal whose phase is reversed,
the repair circuit and the additional repair circuit including the positive-polarity amplifier circuit and the negative-polarity amplifier circuit.

6. The display device as set forth in claim 1, wherein:
the switch circuit (i) electrically disconnects the second auxiliary wire from the positive-polarity amplifier circuit and the negative-polarity amplifier circuit and then (ii) grounds the second auxiliary wire for a predetermined period of time.

7. The display device as set forth in claim 1, wherein:
the switch circuit is switched, only when no scan signal line is selected in a display region of the display device.

8. The display device as set forth in claim 1, wherein:
the data signal line driving circuit includes (i) the positive-polarity amplifier circuit which is plurally provided and (ii) the negative-polarity amplifier circuit which is plurally provided.

9. The display device as set forth in claim 1, wherein:
a Low electric power supply of the positive-polarity amplifier circuit and a High electric power supply of the negative-polarity amplifier circuit are used in common.

10. The display device as set forth in claim 9, wherein:
each voltage level of the High and Low electric power supplies thus used in common is a ground level.

11. The display device as set forth in claim 1, wherein:
a difference in absolute value between a High power supply voltage of the positive-polarity amplifier circuit and a Low power supply voltage of the negative-polarity amplifier circuit is not more than 0.5 V.

12. The display device as set forth in claim 1, wherein:
before being electrically connected to the positive-polarity amplifier circuit, the second auxiliary wire is electrically connected, for a predetermined period of time, to a node whose voltage falls within a power supply voltage range that is higher than a ground level, and
before being electrically connected to the negative-polarity amplifier circuit, the second auxiliary wire is electrically connected, for a predetermined period of time, to a node whose voltage falls within a power supply voltage range that is lower than the ground level.

13. A display device, comprising:
a data signal line driving circuit;
a plurality of data signal lines connected to the data signal line driving circuit;
first and second auxiliary wires, each of which can be connected to each of the plurality of data signal lines, the first auxiliary wire being provided so as to intersect the plurality of data signal lines on a side where end parts of the respective plurality of data signal lines are connected to the data signal line driving circuit, and the second auxiliary wire being provided so as to intersect the plurality of data signal lines on a side of the other end parts of the respective plurality of data signal lines;
a positive-polarity amplifier circuit configured to receive a positive data signal from the data signal line driving circuit via the first auxiliary wire; and
a negative-polarity amplifier circuit configured to receive a negative data signal from the data signal line driving circuit via the first auxiliary wire; wherein
an output signal is supplied to the second auxiliary wire from the positive-polarity amplifier circuit or the negative-polarity amplifier circuit,
the positive-polarity amplifier circuit and the negative-polarity amplifier circuit are included in a repair circuit,
the repair circuit includes a first switch circuit configured to (i) electrically disconnect the first auxiliary wire from the positive-polarity amplifier circuit and the negative-polarity amplifier circuit and then (ii) electrically connect, for a predetermined period of time, the first auxiliary wire to a node whose voltage falls within a power supply voltage range of the positive-polarity amplifier circuit or the negative-polarity amplifier circuit, and
the first switch circuit is switched, only when a polarity of a data signal outputted from the data signal line driving circuit is reversed.

14. The display device as set forth in claim 13, wherein:
the switch circuit (i) electrically disconnects the first auxiliary wire from the positive-polarity amplifier circuit and the negative-polarity amplifier circuit and then (ii) grounds the first auxiliary wire for a predetermined period of time.

15. The display device as set forth in claim 13, wherein:
the switch circuit is switched, only when no scan signal line is selected in a display region of the display device.

16. The display device as set forth in claim 13, wherein:
before being electrically connected to the positive-polarity amplifier circuit, the first auxiliary wire is electrically connected, for a predetermined period of time, to a node whose voltage falls within a power supply voltage range that is higher than a ground level, and
before being electrically connected to the negative-polarity amplifier circuit, the first auxiliary wire is electrically connected, for a predetermined period of time, to a node whose voltage falls within a power supply voltage range that is lower than the ground level.

17. The display device as set forth in claim 13, wherein:
each of the positive-polarity amplifier circuit and the negative-polarity amplifier circuit is connected (i) to the first auxiliary wire via a second switch circuit and (ii) to the second auxiliary wire via a third switch circuit.

18. The display device as set forth in claim 17, wherein:
the second switch circuit and the third switch circuit are switched in response to a polarity signal for reversing a polarity of a data signal to be supplied to the plurality of data signal lines.

19. The display device as set forth in claim 18, further comprising a polarity setting section configured to reverse a phase of the polarity signal.

20. A display device, comprising:
a data signal line driving circuit;
a plurality of data signal lines connected to the data signal line driving circuit;
first and second auxiliary wires, each of which can be connected to each of the plurality of data signal lines, the first auxiliary wire being provided so as to intersect the plurality of data signal lines on a side where end parts of the respective plurality of data signal lines are connected to the data signal line driving circuit, and the second auxiliary wire being provided so as to intersect the plurality of data signal lines on a side of the other end parts of the respective plurality of data signal lines;
a positive-polarity amplifier circuit configured to receive a positive data signal from the data signal line driving circuit via the first auxiliary wire; and
a negative-polarity amplifier circuit configured to receive a negative data signal from the data signal line driving circuit via the first auxiliary wire; wherein
an output signal is supplied to the second auxiliary wire from the positive-polarity amplifier circuit or the negative-polarity amplifier circuit,
the positive-polarity amplifier circuit and the negative-polarity amplifier circuit are included in a repair circuit,
the repair circuit is provided with (i) two first auxiliary wires each of which is the first auxiliary wire and (ii) two second auxiliary wires each of which is the second auxiliary wire, and
in the repair circuit, in response to a polarity signal for reversing a polarity of a data signal to be supplied to the plurality of data signal lines, (i) the data signal, which has been supplied from one of the two first auxiliary wires, is supplied to one of the two second auxiliary wires via the positive-polarity amplifier circuit or the negative-polarity amplifier circuit or (ii) the data signal, which has been supplied from the other of the two first auxiliary wires, is supplied to the other of the two second auxiliary wires via the positive-polarity amplifier circuit or the negative-polarity amplifier circuit.

* * * * *